US012141162B1

(12) United States Patent
Plenderleith

(10) Patent No.: US 12,141,162 B1
(45) Date of Patent: Nov. 12, 2024

(54) DATABASE CONNECTION MANAGER, METRIC-BASED ROUTING AND LOAD BALANCING FOR REPLICA SERVERS

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 15/890,125

(22) Filed: Feb. 6, 2018

(51) Int. Cl.
  *G06F 16/27* (2019.01)
  *G06F 11/30* (2006.01)
  *G06F 11/34* (2006.01)
  *G06F 16/951* (2019.01)

(52) U.S. Cl.
  CPC .......... *G06F 16/27* (2019.01); *G06F 11/3006* (2013.01); *G06F 11/3433* (2013.01); *G06F 16/951* (2019.01)

(58) Field of Classification Search
  CPC .... G06F 16/27; G06F 16/951; G06F 11/3006; G06F 11/3433; H04L 67/141; H04L 67/1095
  See application file for complete search history.

(56) References Cited

U.S. PATENT DOCUMENTS

| | | | |
|---|---|---|---|
| 5,835,755 A * | 11/1998 | Stellwagen, Jr. | G06F 16/24532 707/764 |
| 7,702,610 B2 * | 4/2010 | Zane | G06F 16/2448 707/999.001 |
| 8,484,242 B1 * | 7/2013 | Singh | G06F 16/2453 707/770 |
| 9,032,017 B1 * | 5/2015 | Singh | G06F 16/25 709/219 |
| 9,336,284 B2 | 5/2016 | Lee et al. | |
| 9,491,261 B1 * | 11/2016 | Shagam | H04L 67/40 |
| 11,914,590 B1 * | 2/2024 | Plenderleith | G06F 16/24552 |
| 2002/0116457 A1 * | 8/2002 | Eshleman | H04L 67/2852 709/203 |
| 2004/0049564 A1 * | 3/2004 | Ng | H04L 69/329 709/223 |
| 2006/0074937 A1 | 4/2006 | Bird et al. | |
| 2007/0050328 A1 * | 3/2007 | Li | G06F 16/9032 |

(Continued)

*Primary Examiner* — Brittany N Allen
(74) *Attorney, Agent, or Firm* — Robert C. Kowert; Kowert, Hood, Munyon, Rankin & Goetzel, P.C.

(57) ABSTRACT

Systems and methods are provided to implement a database connection manager that dynamically routes database query statements to database servers storing replicas of the database. In embodiments, the database connection manager may implement a data access interface that mimics the interface of the database servers, so as to appear to clients as just another database server. In embodiments, various health or performance metrics of the servers are monitored, and the routing may be performed based on the metrics to load balance the servers. In embodiments, the routing may distinguish between read and write statements, so that read statements are routed to servers hosting read-only replicas, and write statements are routed to servers hosting writable replicas. These and other disclosed features improve the functioning of the database, to allow, among other things, the database servers to be dynamically load balanced, and the servers' identities to be hidden from clients.

19 Claims, 11 Drawing Sheets

(56) References Cited

U.S. PATENT DOCUMENTS

| | | | | |
|---|---|---|---|---|
| 2007/0112618 A1* | 5/2007 | Krneta | .................. | G06Q 10/04 |
| | | | | 705/20 |
| 2007/0203910 A1* | 8/2007 | Ferguson | ................ | G06F 16/27 |
| 2007/0288526 A1* | 12/2007 | Mankad | .............. | G06F 11/1662 |
| 2008/0046400 A1* | 2/2008 | Shi | .................... | G06F 16/24532 |
| 2012/0260256 A1* | 10/2012 | De Faria | ............... | G06F 9/5011 |
| | | | | 718/103 |
| 2013/0275468 A1* | 10/2013 | Lee | .................... | G06F 16/2329 |
| | | | | 707/770 |
| 2014/0052826 A1* | 2/2014 | Ohkawa | .................. | H04L 67/02 |
| | | | | 709/219 |
| 2015/0149501 A1* | 5/2015 | Prakash | ................ | G06F 9/5027 |
| | | | | 707/769 |
| 2015/0149509 A1* | 5/2015 | Leu | .................. | G06F 16/24554 |
| | | | | 707/803 |
| 2016/0026683 A1* | 1/2016 | Sah | .................... | G06F 16/2453 |
| | | | | 707/770 |
| 2018/0113902 A1* | 4/2018 | Chen | ................ | G06F 16/24535 |
| 2019/0065258 A1* | 2/2019 | Irudayaraj | ......... | G06F 16/24539 |
| 2019/0342398 A1* | 11/2019 | Kasten | .................. | H04L 67/564 |

* cited by examiner

DATABASE CONNECTION MANAGER, METRIC-BASED ROUTING AND LOAD BALANCING FOR REPLICA SERVERS

BACKGROUND

Databases are ubiquitous systems designed to provide storage and access to data for large numbers of database clients. The database clients, in turn, may provide many different services and functionalities in different applications. A database client may connect to the database server, and then issue queries and other requests and performs various actions on the data via the connection. However, the direct connection approach leads to a number of problems in practice. For example, where a database client has been configured to use a particular database endpoint, if that endpoint goes down for maintenance or becomes otherwise unavailable, the database connection to the client is severed and any pending queries or updates will fail. In addition, database clients do not generally have awareness of the operational state of the servers, and thus, client selection of the servers may result in suboptimal performance. Moreover, clients that connect directly to the database servers must maintain knowledge the connection information for these servers, which in some systems may be burdensome or undesirable. These problems generally reduce the efficiency and usefulness of database systems.

Figure 1:
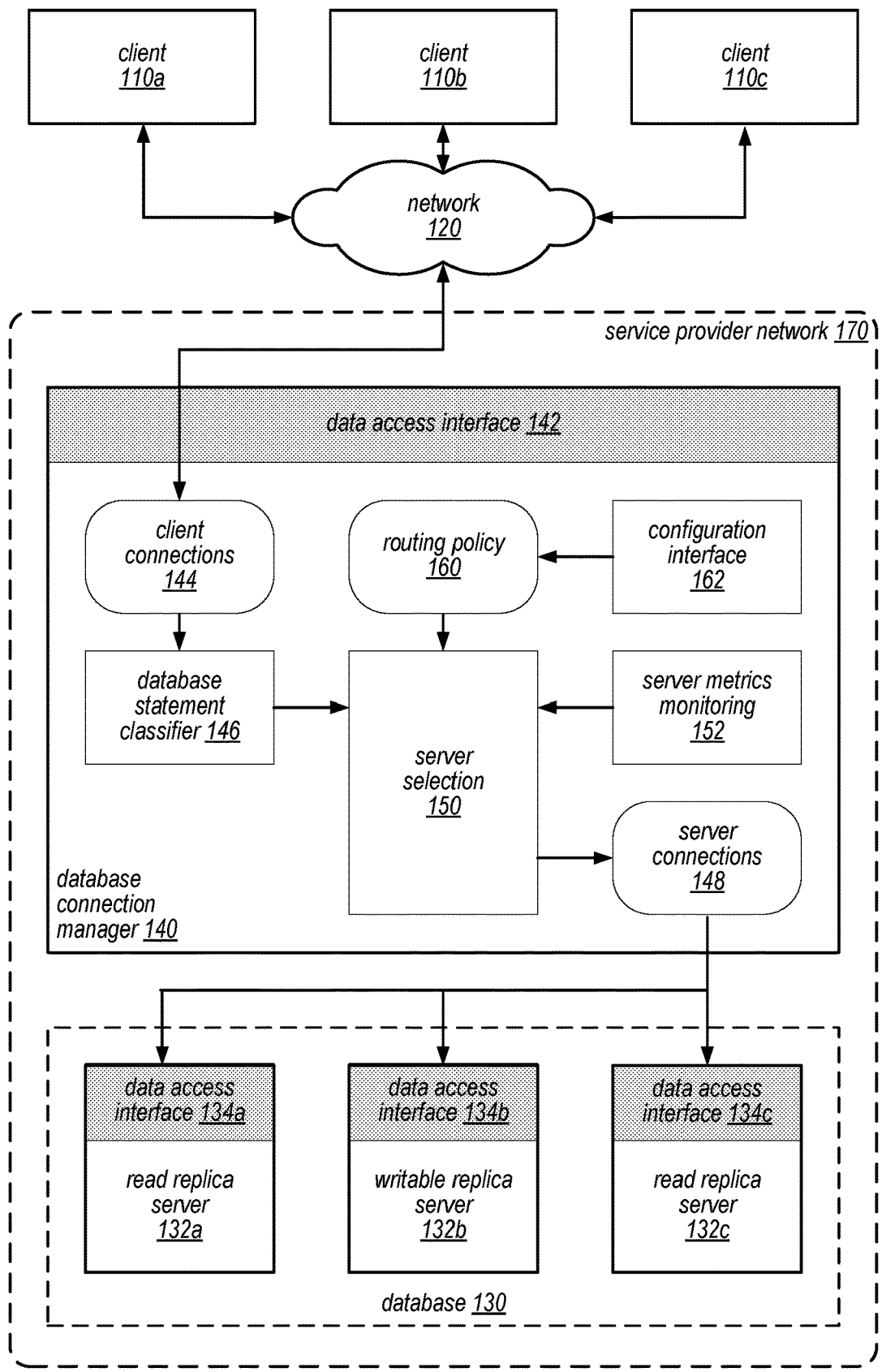
FIG. 1 is a block diagram illustrating an example database connection manager that routes database statements to different replica servers based on server metrics, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a database connection manager that routes database statements to different replica servers of a database based on server metrics. The collected metrics may include data such as a server's current or recent CPU utilization level, memory utilization level, storage utilization level, or network utilization level, among other things. In some embodiments, the database connection manager may distribute incoming database statements to the servers in a fashion that load balances the replica servers. In some embodiments, the database connection manager may also base its server selection decision on one or more classifications of the statement (e.g., whether the statement is a read or a write statement, etc.). Thus, clients of the database do not connect directly to the replica servers of the database, but through the database connection manager, which in some embodiments implements the same data access interface as the replica servers. The connection manager then routes the database statements based on a configurable routing policy, to assign statements to servers that are available and best able to handle each statement.

As one skilled in the art will appreciate in light of this disclosure, certain embodiments may be capable of achieving certain technical advantages over prior art database systems. For example, in prior art systems, if a database client has been configured to use a particular database server, when that database server goes down for maintenance or becomes otherwise unavailable, the client's connection is severed and further queries or updates generated by the client will fail. However, with the use of the database connection manager, an existing client connection is not disrupted as a result of a single database server's failure. For example, in some embodiments, when the database connection manager detects that a replica server has died (e.g., due to a dropped server connection), the database connection manager may automatically re-execute any pending statements for that server on other servers.

In addition, in databases that employ a large number of fungible servers, client selection of servers may result in suboptimal performance, as the servers' request handling capabilities will vary based on their load at any given point in time. Thus, to improve the database's performance, the database connection manager may maintain connections to each replica server and monitor the performance metrics of the replica servers over time. Using the performance metrics, the database connection manager it is able to make dynamic statement assignment decisions based on the servers' current operating conditions, thereby improving database performance.

Moreover, clients that connect directly to the database servers must generally maintain knowledge of the connection information for the servers, which in some systems may be burdensome or undesirable. For example, in some embodiments, when new database servers are added or removed from the database, or when the load balancing scheme changes, updated database drivers or application code may need to be updated on each of the clients. However, by moving the routing and load balancing functionalities to the server side, the need for updates of client-side software is vastly reduced.

In some embodiments, the database's replica servers may include one or more read replica servers, whose data is read only, and one or more write replica servers, whose data is writable. In some embodiments, the database connection manager may take these server classifications into account in its server selection. For example, the database connection manager may examine each incoming statement to determine if it is a read or a write statement, and route read statements to the read replica servers and write statements to the write replica servers.

In some embodiments, the database connection manager may determine that a certain received statement cannot be handled by any currently available replica server. In such situations, the database connection manager may implement a request queue or buffer to temporarily store the new statement, until an appropriate server becomes available. In some embodiments, the connection manager may be configured to stall the client until the statement can be processed. In this manner, the connection manager may implement a global request queue in front of the database servers, and shield the database servers from the ups and downs of unpredictable request traffic.

In some embodiments, the database connection manager may implement some degree of caching of read results. Thus, in some embodiments, read statements may be satisfied by cached data stored at the connection manager, and statement need not be forwarded to an actual database server. In some embodiments, cached data may be invalidated by write statements received at the connection manager. These and other features and benefits of the inventive system and method are described in further detail below, in connections with the figures.

FIG. 1 is a block diagram illustrating an example database connection manager that routes database statements to different replica servers based on server metrics, according to some embodiments. As shown, the service provider network 170 may interact with multiple clients 110a-c. In some embodiments, service server provider network may allow clients 110 to lease or use computing resources within the network 170. In some embodiments, the service provider network may provide to clients many different types of services, including a database service 130. The database system 130 may encompass any type of data store or database configurable to receive database statements from the clients via network 120. In some embodiments, a given client 110 may include a suitable version of a web browser or a plug-in module for a web browser, or other type of code module configured to execute as an extension to or within an execution environment to provide database or data storage service clients (e.g., client applications, users, and/or subscribers) access to the services provided by database system 130. In some embodiments, a client 110 may encompass an application such as a database application, media application, office application or any other application that may make use of persistent storage resources. In some embodiments, an application may include sufficient protocol support to establish a database connection with the service provider network 170, which may be used to send multiple database statements to the database 130.

As illustrated, the data connection manager 140 may receive database statements from and send responses to the clients via a network 120. In various embodiments, the network 120 may encompass any suitable combination of networking hardware and protocols necessary to establish network communications between clients 110 and service provider network 170. For example, network 120 may encompass the various telecommunications networks and service providers that collectively implement the Internet. Network 120 may also include private networks such as local area networks (LANs) or wide area networks (WANs) as well as public or private wireless networks. For example, both a given client 110 and database 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and service provider network 170. In some embodiments, clients 110 may communicate with network-based database 130 using a private network rather than the public Internet. For example, a client 110 may be provisioned within the same enterprise as the database 130 and/or the underlying system described herein. In some embodiments, a client 110 may comprise a service that is offered by the same service provider that offers the database 130 as a service.

In some embodiments, the service provider network 170 may be configured to implement one or more service endpoints configured to receive and process database statements, such as statements to access database objects maintained on behalf of clients/users by database 130, and/or the items and attributes stored in those database objects. For example, database 130 may include hardware and/or software configured to implement various service endpoints (such as replica servers 132a-c) and to properly receive and process database statements directed to those endpoints. In one embodiment, database 130 may be implemented as a server system configured to receive web services requests from clients and to forward them to various components that collectively implement a data storage system for processing. In some embodiments, database 130 may be configured as a distributed system (e.g., in a cluster topology).

The database 130 may include different versions of some of the components illustrated in the figure to provide functionality for creating, accessing, and/or managing tables and/or indexes maintained in database instances within a single-tenant environment than those that provide functionality for creating, accessing, and/or managing tables and/or indexes maintained in database instances within a multi-tenant environment. In various embodiments, the components in the database 130 may be implemented directly within computer hardware, as instructions directly or indirectly executable by computer hardware (e.g., a microprocessor or computer system), or using a combination of these techniques. For example, the components of the database 130 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

As shown, the database 130 may include a number of replica servers 132a-c, which may maintain replicas of at least some of the data stored in the database. In some embodiments, the replica servers may include some replica servers (e.g., writable replica server 132b) that are allowed to update the data, and some other replica servers (e.g., read replica servers 132a and 132c) whose data is kept read-only. In some embodiments, these replicas may communicate with each other to keep their respective replicas of the data up to date. Thus, for example, when data is updated via the writable replica server 132b, that update may be propagated to both read replica servers 132a and 132c, so that their replicas also reflect the update. In some embodiments, the number of servers 132 in the database 130 may be programmatically managed based on for example the volume of statements received for the replicated data or the amount of data that is stored. In some embodiments, the servers 132 may be physical servers. In some embodiments, the servers 132 may be virtual machine instances that are hosted on one or more virtualization hosts. In some embodiments, each server 132 may comprise a single running instance of the database 130, which may correspond to a set of listener processes running on a host. Thus, in some embodiments, the servers 132 may use different computing resources (e.g., different physical or virtual compute nodes) to read or write replicated copies of data.

As shown, in some embodiments, the servers 132 may each expose a data access interface 134. In various embodiments, interfaces 134 may support different types of database statements. For example, in some embodiments, interfaces 134 may be a structured query language (SQL) interface, which allow the servers 132 to receive SQL queries and other SQL data manipulation language (DML) or data description language (DDL) statements. In some embodiments, the interfaces 134 may also specify how connections are established with the servers 132. In some embodiments, the interfaces 134 may implement an application programming interface (API) such as a web services interface that supports a variety of operations on tables or indexes, or other data objects, that are maintained and managed on behalf of clients/users by the data storage service system. The APIs may be provided by the database 130 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some embodiments, may be more compact than a text-based representation). In various embodiments, the system may supply default values (e.g., system-wide, user-specific, or account-specific default values) for one or more of the input parameters of the APIs.

As shown, service provider network 170 may implement a database connection manager 140, which is tasked with receiving database statements from clients 110, and then forwarding or routing the statements to individual ones of the databases servers 132. Thus, in some embodiments, the database connection manager 140 may act as a proxy to the servers 132, so that it directly interacts with the clients 110 for the servers 132. In some embodiments, the database connection manager 140 may expose a data access interface 142 to the clients 110. In some embodiments, the data access interface 142 may mimic the data access interfaces 134 of the servers 132. In some embodiments, the data access interface 142 may appear to clients 110 to be the same as the data access interfaces 132, so that to clients 110, the data connection manager 140 appears to be a database server. Thus, in some embodiments, the clients 110 may be oblivious as to whether they are interacting with an actual database server 132 or a database connection manager 140. In some embodiments, the database connection manager 140 may be an optional component, which may be employed or not, without the client's knowledge.

In some embodiments, the service provider network 170 may include multiple database connection managers 140. For example, in some embodiments, multiple database connection managers 140 may communicate with each other to load balance among themselves. When one connection manager is too busy or servicing too many clients, it may voluntarily hand off a connection request to another connection manager. In some embodiments, the connection managers themselves may be implemented as virtual machine instances hosted on virtualization hosts. In some embodiments, more connection managers 140 instances may be provisioned or launched, depending on the request volume experienced by the database 130. Thus, the database 130 may be programmed to dynamically scale the size of the connection manager fleet, based on the client request demand.

As shown, the database connection manager 140 may maintain client connections 144 to the clients 110, and also server connections 148 to the servers 132. In some embodiments, the connections may be transmission control protocol (TCP) connections of some other type of network connections. In some embodiments, the connections may be application level connections or connections based on other protocols (e.g., database protocols). In some embodiments, when database statements are received from the client, they are received via the client connection 144 associated with the client. In some embodiments, the connection manager 140 then routes the received statement to a server 132 via the server connection 148 associated with the server. The server may process the statement, and then provide a response back to the database connection manager 140. If the statement is a read statement, the response may comprise results of the read. If the statement is a write statement, the response may include an acknowledgement that the write has been performed. The acknowledgement may also include other metadata such as a response code, the time that the write was completed, a number of records affected, etc. In some embodiments, the connection manager 140 may then return the response to the client 110 that sent the statement, via the client connection 144.

In some embodiments, the servers 132 may implement a direct server return protocol, where, the responses from the servers 132 are sent directly to the clients 110, without going through the database connection manager 140. In these embodiments, the database connection manager 140 only operates send database statements to the servers, and do not play a part in sending the response back to the clients. In some embodiments, this approach allows database connection managers to exhibit better performance. However, in some embodiments, the database connection manager 140 may not be able to perform certain functions, because it is no longer observing the return traffic from the servers 132.

In some embodiments, the client connection 144 may be opened via an explicit request by the client 110, and then closed when via another explicit request from the client. In some embodiments, the client connection may be maintained over a session, so that multiple database statements can be communicated to the database connection manager 140 during the session. In some embodiments, the server connections may be opened when explicitly requested by the server, the database connection manager, or a database administrator. In some embodiments, new servers 132 may be discovered by the connection manager 140 via a discovery protocol, or by consulting a registry of currently available servers. In some embodiments, a server connection may be closed when explicitly requested, or when the connection manager determines that an error has occurred with a particular server. For example, in some embodiments, if a server becomes unresponsive or fails to generate expected health heartbeat messages, the connection manager 140 may deem the server to be in error and close the server connection.

In some embodiments, when database statements are received, they may be analyzed via a database statement classifier 146, as shown. In some embodiments, the database statement classifier 146 may determine one or more classifications of the statement, and such information may be used to decide how the statement is routed. For example, in some embodiments, the statement classifier may perform a limited parsing or interpretation of the incoming statement, to determine whether it is a read statement or a write statement. In some embodiments, read statements may be routed to read replica servers, while write statements are always routed to write replica servers. In some embodiments, the routing decision may not always follow the rule rigidly. For example, in some embodiments, when a client issues a write statement following immediately by a read statement (e.g., an insertion of a row and then a query for a row count), the connection manager may determine that the two statements are best handled by a single database server (e.g., because that server is the first server to have the correct row count). Thus, the connection manager may send the follow-on read statement to the same server that handled the write statement, which is a write replica server. In some embodiments, the statement classifier 146 may determine a database object that is the target of the statement. In some embodiments, the statement classifier 146 may determine a client identifier or a timestamp associated with the statement. In some embodiments, the statement classifier 146 may calculate an expected time or amount of processing that is needed for a statement. All of this information may be used by the connection manager 140 to determine how the statement should be routed.

As shown, the database connection manager 140 may include a server metrics monitor 152, which may monitor a selection of operational or performance metrics associated with the servers 132. For example, in some embodiments, each server 132 may be observed to gather server load metrics such as its CPU utilization metrics, memory utilization metrics, storage utilization metrics, network utilization metrics, request volume, request latency, or error count, among other data. In some embodiments, the monitor 152 may periodically ping or query each server 132 for this data. In some embodiments, the servers 132 may periodically provide health status messages (e.g., heartbeat messages) that include this data. In some embodiments, the collected metrics may include an operation state of the servers, for example, whether the server is currently online, offline (e.g., undergoing a maintenance process), or in error (e.g., unresponsive). In some embodiments, performance metrics of the servers may be collected, such as the latency of processing database requests or statements. In some embodiments, the health message may also indicate upcoming events of the server, for example, an indication that the server will reboot within 10 minutes. In some embodiments, this metrics data may be collected over the same server connections 148 that are used to route the statements to the servers. In some embodiments, the metrics may be gathered via a different connection to the servers or from a different source. All of the collected server metrics may be tracked by the database connection manager 140 to determine how to route incoming database statements.

In some embodiments, the metrics used for server selection may not necessarily come from the database servers themselves. For example, in some embodiments, the metrics may be gathered from other systems, such as for example the storage area network (SAN) devices that a database server is using. For example, in some embodiments, the SAN devices may be queried to the volume of the read or write traffic to persistent storage that originate from the database server. In some embodiments, the database server may be a virtual machine instance, and the virtualization host (e.g., the operating system of the host) may be queried to obtain network utilization metrics of the database server. In the event that a particular database server is experiencing excessive network traffic (e.g., as allotted via a routing policy), further database statements may be routed elsewhere.

In some embodiments, the gathered metrics may include metrics of other devices in the database 130 network. For example, in some embodiments, the network topology of the database network may be taken into account. In some embodiments, the connection manager 140 may be aware that two database servers are connected to the same switch. Thus, the connection manager may distribute database statements so that the traffic going through each switch are equalized. In some embodiments, the when it is detected that a particular switch is under heavy load, the connection manager may route less statements to all servers that are dependent on that switch. In some embodiments, metrics may be gathered from network devices such as network switches, and such metrics may include things such as packet discards, network errors, or network latency, etc.

As shown, the database connection manager 140 may implement a server selection module 150, which may be configured to perform the task of routing each database statement to a server 132. As discussed, the routing decision may be made based on one or more classifications of the database statement, and also the metrics collected for the servers 132. In some embodiments, as shown, the routing decision may be governed by a routing policy 160, which may comprise a set of rules that dictates or impacts how certain statements are routed. For example, one routing rule may specify that all statements directed to a particular table should be directed to a special set of servers. In some embodiments, the routing rules may specify a preference list of servers, so that, under certain situations, a first server should be tried first, following by a second server, and so on.

In some embodiments, the routing policy may specify that certain types of more compute-intensive database statements should be routed to a more capable server, whereas simpler database statements should be routed to a less capable server. For example, the connection manager may be configured to recognize a particular type of query against a very large table, which may benefit from parallel processing. Accordingly, the connection manager may route the query to a multi-processor database server that is capable to parallel processing.

In some embodiments, the routing policy may specify that certain speed-critical database statements should be routed to a group of database servers, and results from the first database server that responds will be returned. This method thus allows the read results to be obtained from the fastest server in the group. In some embodiments, the connection manager may simply send a database statement to all database server to which it is connected.

In some embodiments, the routing policy may specify that certain database statements should be routed to database servers of a particular version. For example, in some embodiments, the connection manager may be aware of the different versions of each database server (e.g., versions A and B). Version B may be optimized to handle a particular type of database statement that cannot be correctly handled by version A. As another example, version B may perform much better when handling a type of database statement than version A. Accordingly, the connection manager may be configured to recognize this type of database statement, and prefer to route them to servers under version B.

In some embodiments, the routing policy may be based on (or implement) licensing restrictions. For example, in some embodiments, a particular client's license may restrict the client to use only four servers at a time. Thus, the connection manager may limit its routing destinations for that client to only four database servers. In some embodiments, the routing policy may be based on a calculated cost to the client. For example, in some embodiments, the cost model to the clients may differentiate between different types of servers. Accordingly, the connection manager may prefer to route client statements to servers in a manner so as to reduce the client's costs of using the database.

As shown, in some embodiments, the routing policy 160 may be configured via a configuration interface 162. In some embodiments, the configuration interface 162 may be a graphical user interface (GUI), which may allow a database user or administrator to specify different types of routing policy elements. In some embodiments, the configuration 162 may be a different type of interface, such as a command line interface or simply a configuration file or data repository.

Depending on the embodiment or the routing policy, the server selection module 150 may implement a variety of server selection behavior. For example, in some embodiments, the server selection module 150 may route database statements, at least partly, in a pseudorandom manner to any server in a set of acceptable servers. In some embodiments, the routing may be weighed according to a formula or a score, to favor those servers that are currently idle or not heavily loaded. In some embodiments, the server selection module 150 may implement a round robin scheme, where a next server to be assigned a statement of a particular type is one that was least recently assigned that type of statement. In some embodiments, the server selection module 150 may assign all statements from a single client within a period of time to the same server. Using this approach, the connection manager may allow the database to take advantage of certain result caching optimizations that may be implemented in the servers 132. In some embodiments, the statement may be forwarded to the server 132 via the data access interface 134 of the server.

In some embodiments, the database connection manager 140 may implement additional features that are related to interactions with clients. For example, in some embodiments, the connection manager 140 may encrypt communications with the client, so that these communications are protected when they are transmitted over an unsecured or public network. In some embodiments, the database connection manager 140 may also be responsible for decrypting received messages from the clients. In some embodiments, the encryption and decryption may be performed with the same symmetric key. In some embodiments, the encryption may be performed with an asymmetric key, for example, the database connection manager 140's private key, so that the client can decrypt it using a counterpart key, for example, the database connection manager 140's public key. In some embodiments, the encryption and decryption may be performed as part of the connection to the client, which may implement encryption and decryption as part of the connection protocol.

In some embodiments, the database connection manager 140 may implement data compression. For example, the database connection manager may compress large responses, for example results of read data, so that the data may be transmitted more quickly over the network 120. In some embodiments, the compression and corresponding decompression by the client may be performed as part of the connection to the client, which may implement these features as part of the connection protocol. In some embodiments, the database connection manager 140 may implement a pagination mechanism, so that, for example, results of read statements are provided to the client in pages. In some embodiments, the pagination mechanism may include one or more API calls that allow the client to move forward or backwards in the result set, and request different pages of results be fetched or obtained. In some embodiments, the database connection manager 140 may buffer an entire result set in its memory in order to service the client's pagination requests. In some embodiments, the database connection manager 140 may forward pagination requests to the underlying servers 132, which may also support pagination of results.

The illustrated database connection manager 140 may be useful to implement a number of higher level features for the database 130. For example, in some embodiments, the database connection manager 140 may be used to implement disaster recovery. In some embodiments, the database connection manager 140 (or other peer database connection managers) may be connected to two groups of servers, a primary group that is actively handling client statements and a backup group that is used in case of a failure of the first group. For example, in some embodiments, to ensure high availability of the system, the database may maintain the two groups of servers in two different physical locations (e.g., an on-premises server group and an in-the-cloud server group). When the primary server group fails (e.g., due a mass power failure), the database connection manager 140 may immediate detect these failures from its connections or metrics monitoring of these servers, and immediately and seamlessly redirect all client statements to the backup server group. In some embodiments, this switchover may occur without the clients having to reestablish connections or perform any corrective actions. In some embodiments, because the client connections themselves are not severed, the server group switchover may be largely invisible to the clients.

In another scenario, the database connection manager 140 may act as a security gateway, which may be used to hide the identities of the servers 132 that are handling the statements. For example, in some embodiments, the database connection manager may provide a public network address for the database 130, while hiding from clients the actual network addresses of the servers. This may be an important feature in some systems where, for example, the IP addresses and/or locations of the servers must remain secret. In some embodiments, the database 130 may be implemented in a decentralized fashion, so that the servers themselves may be located anywhere. In some embodiments, the database connection manager 140 may also implement additional security features, for example, to recognize and ward off attacks from the public network, or to scrub outgoing data to remove any unintended or private information.

In yet another scenario, the database connection manager 140 may implement an access permission layer for the database 130. For example, in some embodiments, one or more connection managers 140 may maintain a list of client identities or roles and their respective access permissions (e.g., which tables they may read or write, what actions may perform, etc.). In some embodiments, the database connection manager 140 may enforce these permissions by denying unauthorized actions or statements from the clients. For example, a particular client may not have permission to delete data from a master table. When a delete statement is received from the particular client, the database connection manager 140 may recognize the statement as an access violation, and refuse to route the statement. Instead, the database connection manager 140 may respond to the client with an access violation error.

Figure 2:
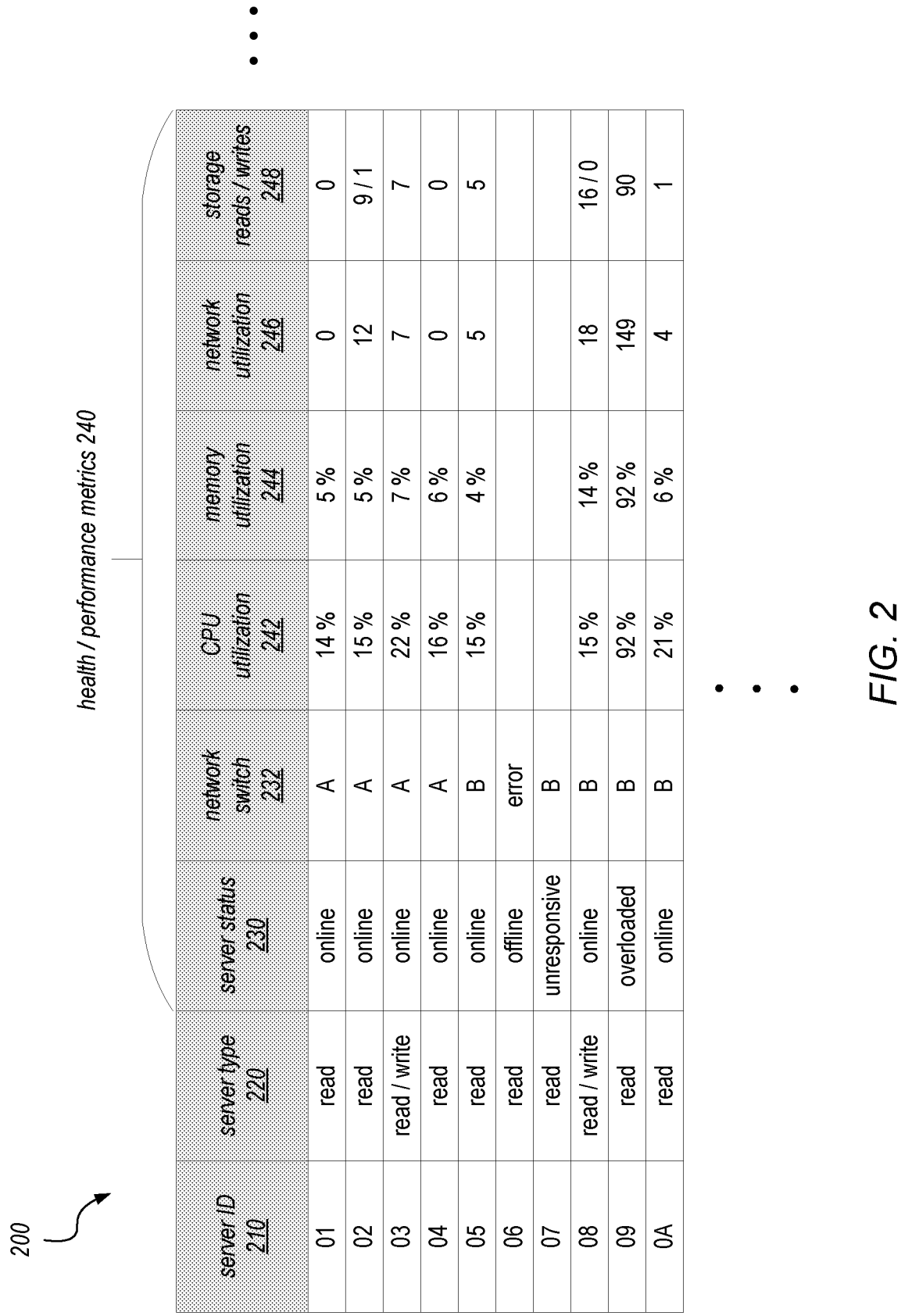
FIG. 2 illustrates example server information and metrics that may be collected by a database connection manager and used to route database statements to different replica servers, according to some embodiments.

FIG. 2 illustrates example server information and metrics that may be collected by a database connection manager and used to route database statements to different replica servers, according to some embodiments. As discussed, in some embodiments, the database connection manager (e.g., database connection manager 140 of FIG. 1) may collect or monitor various metrics of the replica servers, for example via the server metrics monitor 152. These metrics may then be used to make statement routing decisions, for example, in accordance with the routing policy 160.

The figure depicts a table of metrics that are maintain for each server in the database. In some embodiments, the table may be stored in a data repository of the database connection manager. In some embodiments, the table may be maintained entirely in runtime memory. In some embodiments, the table may be stored in shared memory that can be access by multiple database connection managers. As shown, the table includes one record for each known server in the database, which have respective server identifiers as indicated in field 210. The other fields in this example indicate different types of metadata or metrics associated with the servers, and some of the data may be dynamically updated by the server metrics monitor.

As shown, server type field 220 may indicate the type of the server, e.g., whether it is a read server (a server that hosts a read-only replica) or a read/write server (a server that hosts a writable replica). In some embodiments, additional server types may be used. For example, in some embodiments, different types of servers may be designed for different types of statements, different types of database data, or different types of clients, etc. As discussed, the server type may be specified in routing rules and used to route database statements to different servers.

As shown, the table 200 may include different types of metrics 240 that are monitored for each server. These metrics may be updated dynamically and used to make statement routing decisions for incoming database statements. As shown, server status field 230 may indicate a current state, status, or operational condition of the server. Depending on the embodiment, these may indicate different kinds of server states, such as for example whether the server is online or offline (e.g., undergoing a maintenance event), whether the server is considered to be in an error condition (e.g., unresponsive), or whether the server is overloaded or not. In some embodiments, the status field or another field may indicate anticipated or scheduled events for a server, for example, that a server is about to be rebooted in the next 5 minutes.

As shown, in some embodiments, the network switch 232 that is connected to the server may be shown. In some embodiments, this network topology information may be obtained by querying a network management entity in the control plane, for example. As shown, the servers are all connected to two network switches A and B. As shown, in some embodiments, the network switch may be deemed to be in error. In some embodiments, the connection manager may take the network topology into account in its statement routing decisions. For example, the connection manager may attempt to roughly balance the traffic sent across each switch. In some embodiments, when one switch is more heavily utilized than another, the servers of the less utilized switch may be preferred during server selection. In some embodiments, the connection manager may attempt to route the statements of a client to servers that are close to the client in the network topology, or proximal geographically. This routing behavior may be beneficial in a variety of situations, for example, when the database servers are operating in a direct server return (DSR) mode. By matching clients with servers that are close to them, the direct responses from the servers can be delivered much faster.

As shown, in some embodiments, the processor or CPU utilization level 242 of a server may be monitored. For example, the monitor may determine, for each CPU cycle in the last minute, the percentage of cycles that the CPU was actively processing instructions. In some embodiments, the memory utilization 244 of the server maybe monitored. For example, an example memory utilization metric may indicate, for the past minute the average amount of runtime memory that the server is using, in percentage terms. In some embodiments, the network utilization 246 of the servers may be monitored. In some embodiments, the amount of network traffic entering or existing a server may be tracked by the network's control plane, or for example a virtualization host hosting the database servers (which may be virtual machine instances). In some embodiments, the table may also track the number of reads or writes to storage 246 performed by each server. In some embodiments, such information may be obtained from for example the storage area network devices that are serving each server. In some embodiments, again, the virtualization host may be used to obtain the storage access metrics for its hosted virtual machines.

As will be appreciated by those skilled in the art, other types of server metrics may be collected and tracked. In some embodiments, the monitor may also track the count of statements handled by each server. For servers that handle both read and write statements, the metric may distinguish between the number of reads versus the number of writes. In some embodiments, the table may track the statement processing latency of each server, for example, the average time it took to process each statement received in the past 5 minutes. For example, in some embodiments, when a server is overloaded, it may deny certain statements via a throttling exception. In some embodiments, the number of throttling exceptions or other types of errors may be monitored.

As discussed, all of these monitored metrics may be used by the database connection manager to select servers to handling incoming statements. In some embodiments, the database connection manager may compute a load score for each server based on a formula, and rank the servers in terms of their score. In some embodiments, the servers may be classified into categories based on their current metrics. In some embodiments, servers that are overloaded may not receive any new incoming statements, or be assigned fewer new incoming statements. For example, as shown in the figure, server 09, based on its metrics may be deemed to be presently overloaded. Thus, the database connection manager may stop routing database statements to server 09 for a time period. In this manner, the database connection manager may load balance the statements among the servers, so that the clients are treated fairly and receive the best possible performance from the database.

Figure 3:
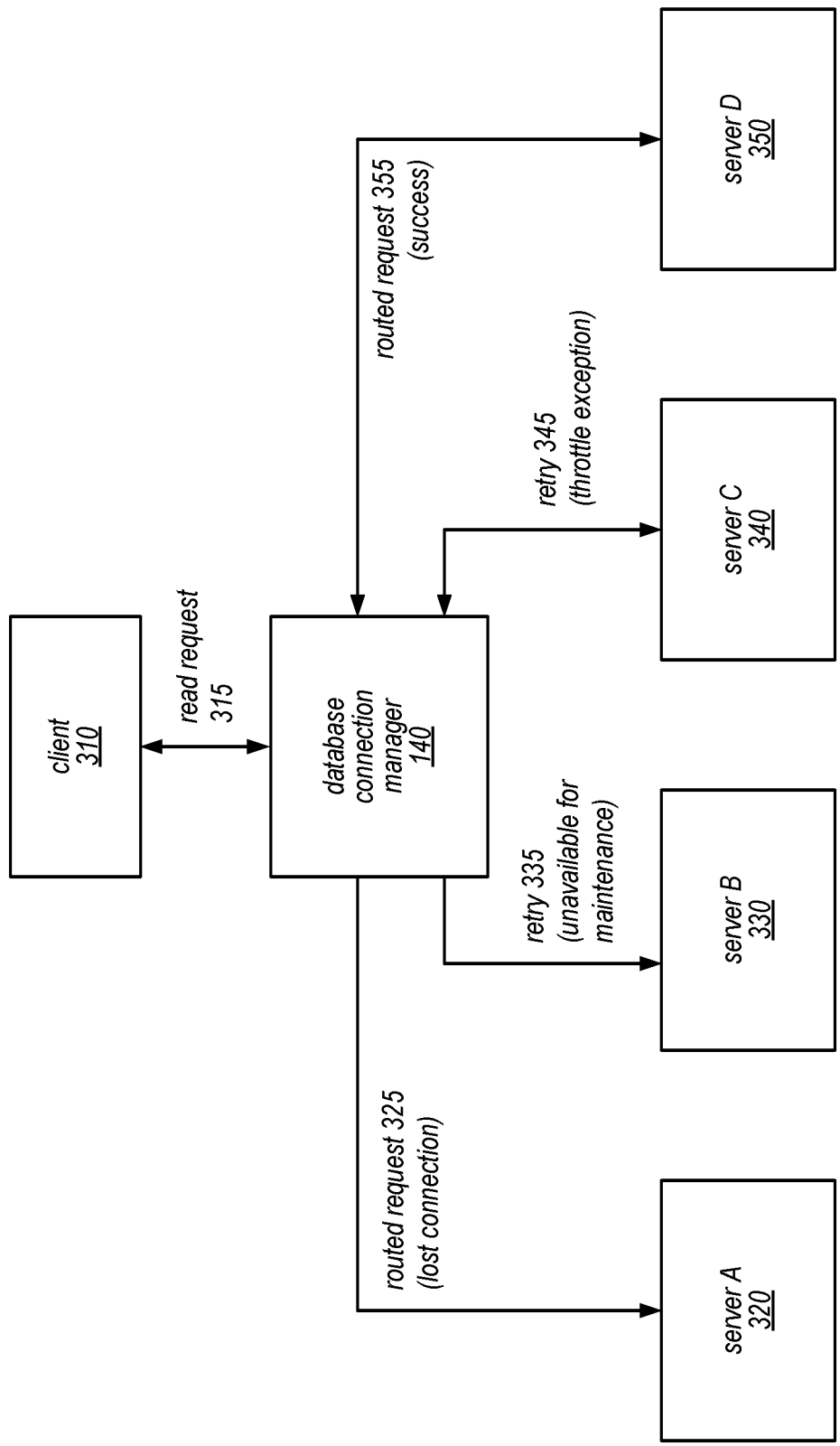
FIG. 3 is a diagram illustrating example behavior of a database connection manager to retry a database statement with multiple replica servers, according to some embodiments.

FIG. 3 is a diagram illustrating example behavior of a database connection manager to retry a database statement with multiple replica servers, according to some embodiments. As shown, in some embodiments, the database connection manager 140 may be configured to retry statements that have been already routed to one database server using another database server, if problems are detected with the first database server. In some embodiments, the retry behavior of the database connection manager 140 may be controlled via the routing policy 160, as discussed in connection with FIG. 1

As shown, a client 310 may send a read statement 315 to the database connection manager 140 via its client connection with the database connection manager. Although the figure depicts a retry of a read statement, in some embodiments, write statements may also be retried by the database connection manager. As shown, the read statement is first routed 325 to server A 320. In this example, after the statement was routed, the server connection between server A and the database connection manager is lost. Responsive to this event, the database connection manager may then retry the read statement using another server, for example server B 330. Notably, in some embodiments, the client 310 will not need to have any knowledge of the failure of server A, or the retry attempt to server B, as nothing will occur over its client connection with the database connection manager. Thus, in some embodiments, client 410 will not experience anything in response to the failure of server A. In some embodiments, the client 310 may experience a slightly longer latency for the read statement. In some embodiments, the client 310 may be notified of the failure of a server A via an informational message, but client 310 need not take any further action with respect to the read statement, as the retry is automatically performed by the database connection manager.

As shown, the database connection manager 140 may next retry the read statement 335 with server B 330, by rerouting the statement to server B. In some embodiments, server B may be selected according to the normal routing policy of the database connection manager, which may take into account the current load or metrics of the various servers, as well as one or more classifications of the statement. As shown, server B in this example is not available due to a maintenance operation on the server. In some embodiments, this information may be obtained from a control plane of the database. In some embodiments, a timeout error may also be detected if server B fails to provide an expected heartbeat message to the database connection manager. In this event, the database connection manager may again decide to abandon the statement sent to server B, and retry to statement with another server, this time server C 340. In some embodiments, this retry behavior may continue for many database servers, until the statement is properly handled by a server.

As shown, the database connection manager 140 next reroutes the read statement 345 to server C 340. However, server C generates a throttle exception in response to the statement. In some embodiments, database servers may generate throttle exceptions if they are too busy. For example, if the internal statement queue of a database server overflows, this may result in a throttle exception, which means that a new statement will not be placed on the server's queue, and will be ignored. In response to the throttle exception, the database connection manager may reroute the read statement another time, this time to server D 350.

As shown, server D 350 is able to successfully handle the read statement. In some embodiments, this means that server D is able to correctly fetch the data in the database that is requested by the read statement, and return that data in a response to the read statement. In some embodiments, the database connection manager 140 may then return that response back to the client 310 via the client connection. Thus, the database connection manager is able to provide a degree of robustness to the database to cope with multiple server failures. Again, despite the multiple reroutes, client 310 may not experience an explicitly failure response from the database, except for possibly an increased latency.

Figure 4:
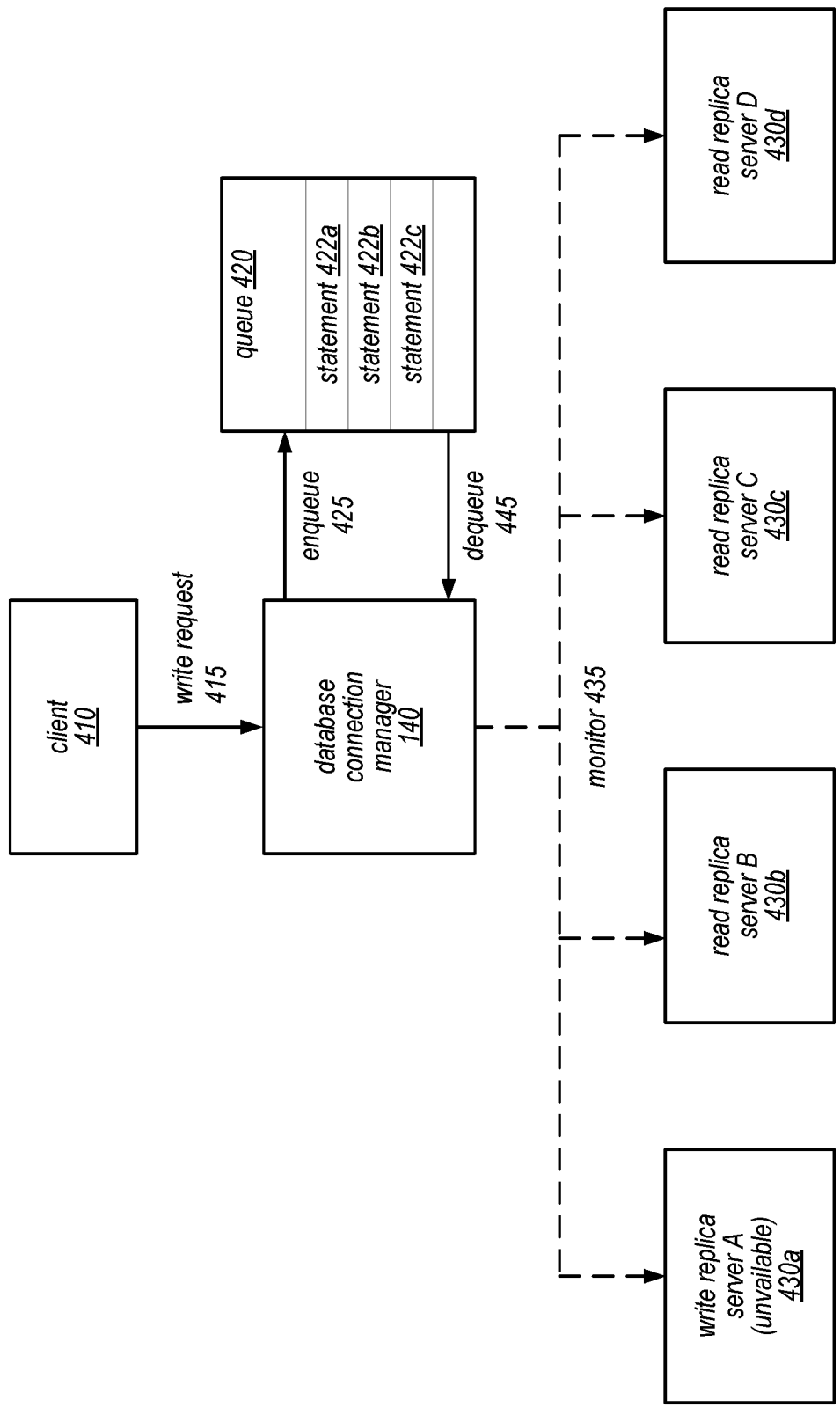
FIG. 4 is a diagram illustrating example behavior of a database connection manager to queue a database statement when no replica server is available to handle the statement, according to some embodiments.

FIG. 4 is a diagram illustrating example behavior of a database connection manager to queue a database statement when no replica server is available to handle the statement, according to some embodiments. As shown, in some embodiments, the database connection manager 140 may implement a queue 420 or buffer to temporarily hold statements that cannot be immediately routed to a database server. In some embodiments, all incoming database statements may be placed in an incoming queue before they are processed for routing purposes. In some embodiments, if no current database server the replica server group can accept a new statement, the statement may be placed in the wait queue until an appropriate server becomes available. At that point, a next statement in the wait queue may be removed and routed to the appropriate server.

As shown, a client 410 may send a write statement 415 to the database connection manager 140 via its client connection. Although the statement in this example is a write statement, in some embodiments, the database may also queue read statements. As shown, the database connection manager 140 may determine that server A 530a is qualified to handle the write statement, because it is hosting a writable replica of the database. The other servers 430b-c are not qualified to handle the write statement because they are read replicas, as shown. However, based on the monitoring 435 of the metrics of the server 430a, the database connection manager may determine that server 430a is currently unable to accept the incoming write statement.

For example, as shown, server A 430a may be temporarily unavailable. This may be because server A is temporarily taken offline for maintenance, or simply going through a normal reboot, maintenance operation, or bookkeeping operation, etc. In some embodiments, server A 430*a* may be currently in an error state. This may be due to an error that was detected as a result of a previous statement, for example, indicating that server A cannot properly write data to its storage. As another example, server A may indicate in its reported metrics that it detected a corruption in its data, and is working to resolve the issue. As another example, server A 430*a* may be currently overloaded. This condition may be determined by the database connection manager 140 via server A's metrics, or determined by server A itself and reported to the database connection manager.

In this situation, since server A 430*a* is not able to immediately handle the incoming write statement, the database connection manager 140 may enqueue the statement 425 in the queue 420. The queue 420 may temporarily store statements that cannot be currently handled by the servers. When one of the write replica server 430*a* becomes available to handle the write statement, the database connection manager may detect this condition and immediately dequeue 445 the write statement from the queue, and route the statement to the available server. In some embodiments, during the time that the statement is queued, the database connection manager may provide some indication to the client 410 that the statement is pending. In some embodiments, the database connection manager may provide some progress update indicating an approximate wait time for the queued statement. In some embodiments, when the queue 420 overflows or becomes unacceptably long, the database connection manager may issue busy errors or throttle exception to the client 410, and stop receiving further statements.

Depending on the embodiments, different types of queues 420 may be implemented. In some embodiments, a single queue may be used for all incoming statements. In some embodiments, different queues may be used for different types of statements (e.g., read or write statements). In some embodiments, different queues may be used for different clients (or client types) or different servers (or server types). In some embodiments, a statement queue may be shared by multiple database connection managers 140.

In some embodiments, an outgoing queue or buffer may be implemented for outgoing responses to the clients. Such a queue or buffer may be useful to temporarily retain statement responses to a particular client, when connection to that client is lost prematurely. When the client connection is lost before responses have been sent to the client, the responses may be temporarily stored for a period of time, so that if the client reconnects with the connection manager within the time period, the connection manager will provide the queued responses back to the client immediately. In this manner, the client's database statements do not have to be reprocessed. In some embodiments, individual response buffers may be set aside for individual connecting clients. In some embodiments, all client responses may be stored in a shared memory buffer.

In some embodiments, both the state of the queue 420 and the server metrics (e.g., metrics 240 of FIG. 2) may be accessible via other access or administrative interfaces. In some embodiments, this data, which reflects a current state of demand on the database, may be used to schedule system maintenance activities or determine whether such activities should be presently performed. For example, in some embodiments, when an administrator attempts to manually reboot a database server, the control plan may warn the administrator that under current database loads (e.g., several servers overload and long wait queue), this is not the ideal time to reboot the server. In some embodiments, the control plan may dynamically schedule maintenance operations in the database based on the metrics and the queue information collected by the connection managers.

Figure 5:
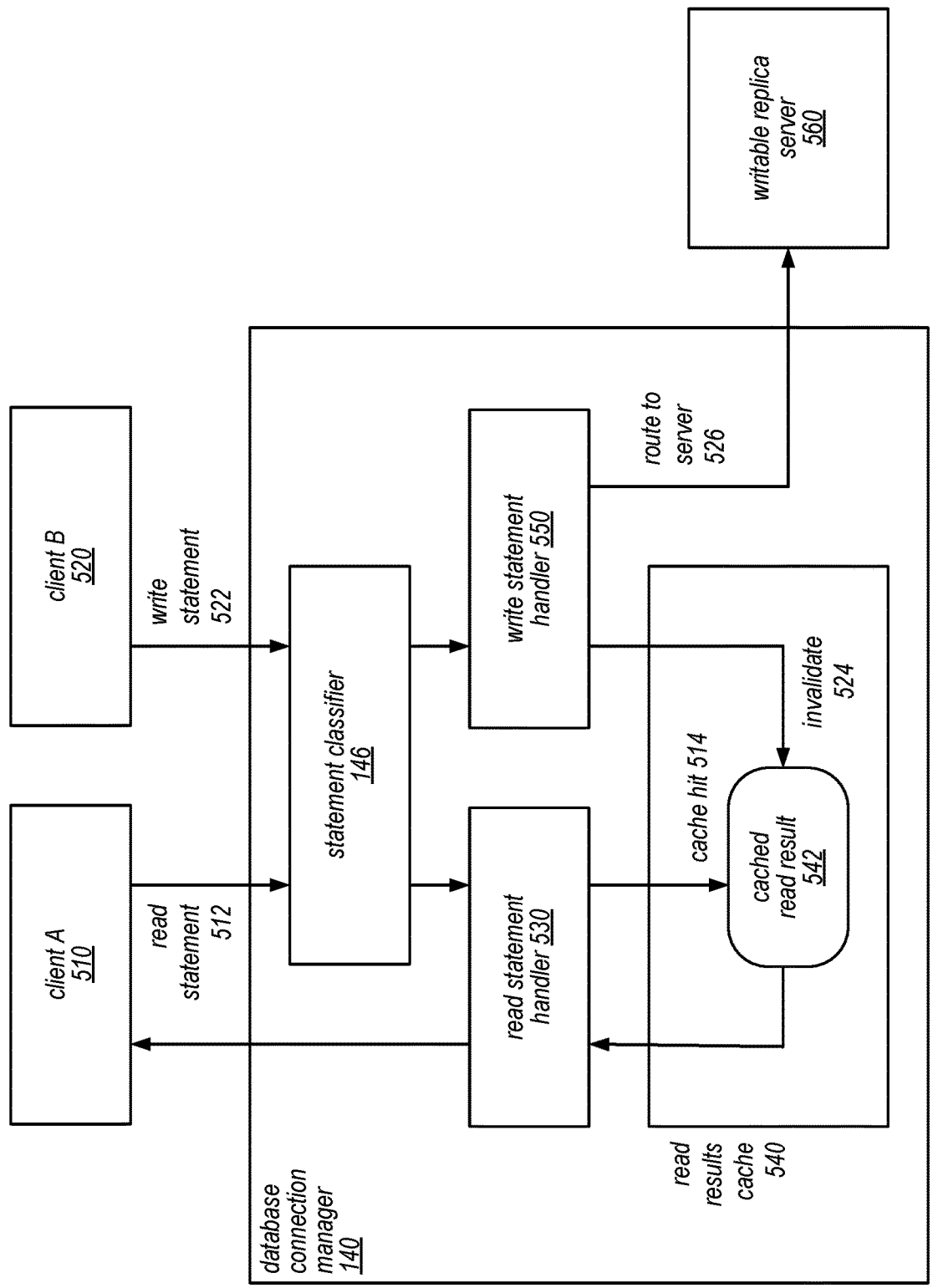
FIG. 5 is a diagram illustrating example behavior of a database connection manager to cache results of a read statement, according to some embodiments.

FIG. 5 is a diagram illustrating example behavior of a database connection manager to cache results of a read statement, according to some embodiments. As shown, in some embodiments, the database connection manager 140 may implement a read result cache 540 that caches read results at the connection manager level, so that if a read statement results in a cache hit, the connection manager will simply return the cache result, without routing the read statement to one of the database servers.

As shown, in the illustrated example, client A 510 issues a read statement 512 to the database connection manager 140 via its client connection. In some embodiments, as shown, the statement classifier 146 may be used to classify the incoming statement, for example, to determine whether the statement is a read statement or a write statement. In some embodiments, the statement classifier 146 may parse or interpret the incoming statement in order to make its classification. As shown, in some embodiments, the database connection manager 140 may implement a read statement handler 530, which may be capable of further parsing or interpreting the read statement to determine what data is being requested.

In some embodiments, the read statement may then be checked against the read results cache 540, as shown. In some embodiments, the read results cache 540 may be maintained in the runtime memory of the database connection manager 140, so that any cached results can be fetched much more quickly than from persistent storage. In some embodiments, the read results cache 540 may be configured to cache only certain types of data in the database, for example, data that are easily looked up, or data that is frequently accessed, etc. For example, in some embodiments, the cache 540 may include a key-value data store, where the keys are recently encountered queries or query criteria (or predicates) from the clients, and the data are the read results associated with the query or query predicates. In some embodiments, the configuration interface 162 may implement one or more user interfaces that allow a user to specify what data is to be cached in the read results cache (e.g., only data from a particular table). In some embodiments, the read results cache may be maintained in a shared memory that is accessible by multiple database connection managers.

As shown, in the illustrated example, the read statement 512 results in a cache hit 514 in the cache 540. Accordingly, the cache result 542 may be directly returned to the client A 510. Thus, the read statement 512 is handled without the statement having to be routed to a database server. In some embodiments, use of the cache 540 may dramatically improve the read performance of certain types of read statements. In some embodiments, in the event that a read statement results in a cache miss, the database connection manager 140 may route the statement to one of the database servers, as discussed previously. When the read results are obtained from the database server, the database connection manager may at that point add the read results to the cache. Thus, the next time the same read statement is received, the read result will be already available in the cache 540. In some embodiments, the size of the cache 540 may be smaller than all of the possible read results that can be stored. Thus, in some embodiments, entries in the read results cache 540 may be evicted, based on some heuristic. For example, in some embodiments, the least recently used cache entry may be evicted to make room for a new entry. In some embodiments, the eviction may be performed based on collect metrics for the servers or the clients. For example, a piece of data that has been read or written very frequently, or has been requested by a high-priority client, may be kept in the cache longer than other cache entries.

As shown, in the illustrated example, client B 520 may issue a write statement 522. In this example, the write statement impacts at least some of the cache read result 542 in the cache. As shown, in some embodiments, the database connection manager 140 may implement a write statement handler 550. The write statement handler 550 may be configured to parse or interpret the write statement, and determine whether the write statement impacts any of the read results in the cache 540. In some embodiments, this determination may be performed pessimistically. For example, in some embodiments, any write to a particular table may be deemed to impact all cache entries associated with that table. As shown, in the illustrated example, once it is determined that the cache read result 542 is affected by the write statement 522, the write statement handler 550 may invalidate the cached read result 542 in the cache. In some embodiments, the invalidation may simply modify a validity flag associated with the corresponding cache entry. Accordingly, the next read statement that requests the cache read result will not result in a cache hit (as the result has been invalidated), and the next read statement will be routed to a database server to be handled by that server.

As shown, in addition to invalidating the cached read result 542, the write statement handler may also route 526 the write statement to the server 550 in the manner as discussed previously. In some embodiments, instead of simply invalidating the cached read result 542, the write statement handler may actually write the contents of the write statement in the cache 540. In some embodiments, the write statement handler may only apply the write statement to the cache, and not immediately route the write statements to the servers. In some embodiments, the database connection manager may tag entries in the cache that have not been persisted to the servers, and lazily flush these entries to the servers periodically. In some embodiments, this approach may allow certain write statements to be acknowledged much more quickly.

Figure 6:
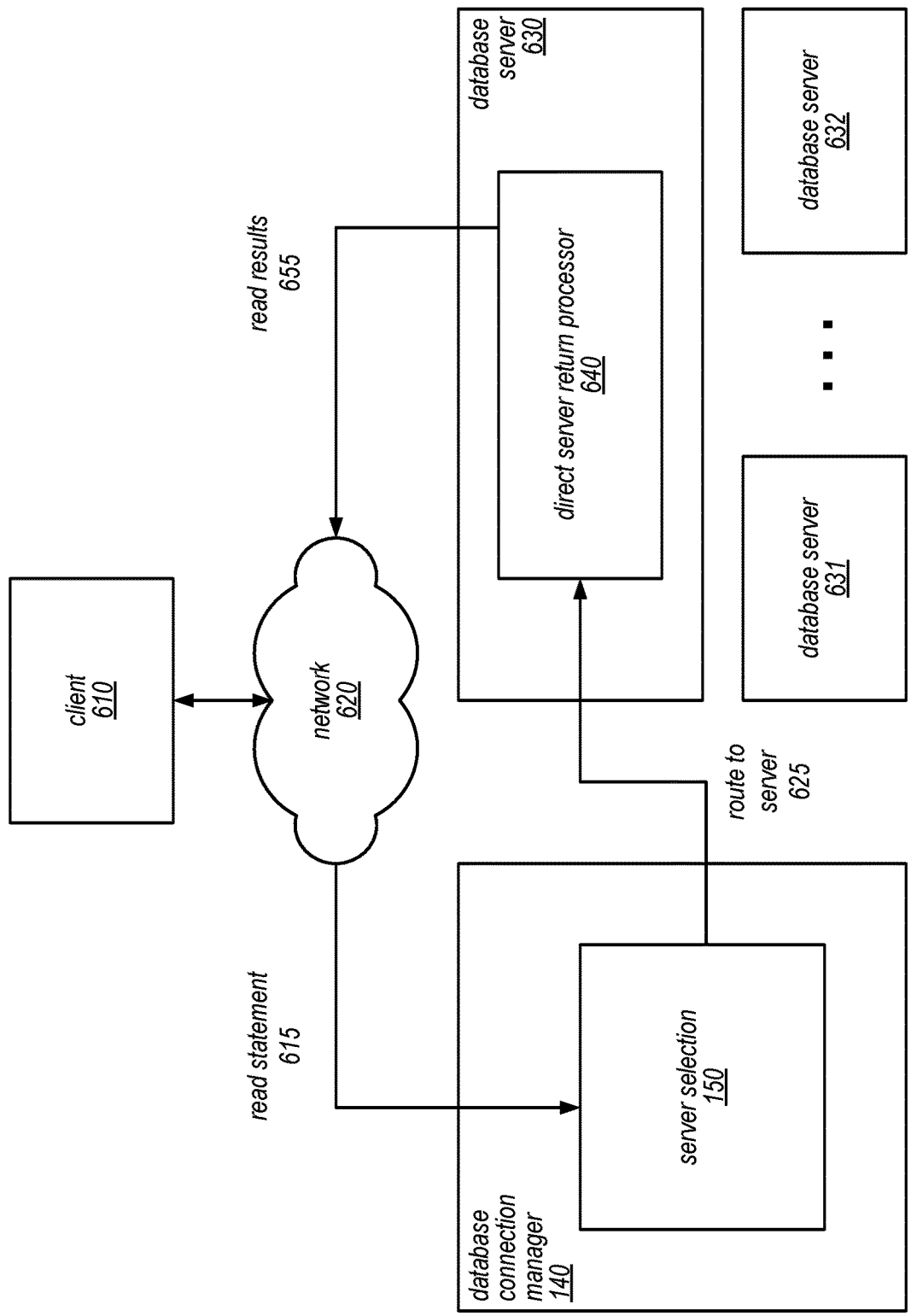
FIG. 6 is a diagram illustrating example behavior of a database replica server to implement a direct server return, according to some embodiments.

FIG. 6 is a diagram illustrating example behavior of a database replica server to implement a direct server return, according to some embodiments. As discussed previously, in some embodiments, the connection manager 140 may be responsible for returning database statement results (e.g., read results, write acknowledgments) back to the client 610. However, in some embodiments, as shown, the database server 630 may implement a direct server return (DSR) protocol, where the server directly returns the response to the client 610, without going through the database connection manager 140.

As shown, the client 610 may send a read statement 615 to the database connection manager 140. In some embodiments, the read statement 615 may be encapsulated as a network message or packet. For example, the packet may by an Internet Protocol (IP) packet that specifies the sender's IP address and the connection manager's IP address, which may be a virtual IP address used by the database service. As shown, the database connection manager may then select a server (here server 630) to handle the read statement and route 625 the statement to server 630.

As shown, in this example, the database server 630 may employ a direct server return processor 640, which may be configured to directly return the statement response to the client 610. In some embodiments, the DSR processor 640 may obtain the client's IP from the incoming packet. Then, to respond to the client 610, the DSR processor may make the client IP address the destination address of the outgoing response packets. In some embodiments, the DSR processor 640 may also rewrite the sender IP address on the response packets, so that the packet appears to come from the service IP address or the connection manager. The response packets will be routed by routers in the network 620 back to the client 610. Thus, in some embodiments, the client 610 may perceive the statement response as coming from the service IP address. The client 610 may not be aware whether the service provider network is employing direct server return, or not. In some embodiments, the functionality of the DSR processor 640 may be implemented in the operating system of database server 630 or the database engine of the database server 630.

The direct server return protocol is useful in some embodiments, where it is desirable to obtain the responses (e.g., read responses) very quickly. In some embodiments, because the connection manager 140 is not forwarding responses to the client, the entire process may be completely much more quickly. In some embodiments, the DSR approach reduces resource usage by the connection manager, and reduces the possibility that the connection manager will become a bottleneck. However, in some embodiments, because the connection manager is no longer receiving responses from the servers, the connection manager may not perform more sophisticated routing tasks (e.g., retry statement upon failure, etc.) However, in some embodiments, the database servers may still return an exit code for each processed statement, so that the connection manager may determine whether a statement succeeded or not. Thus, in some embodiments, the connection manager may still implement statement retries, even though it is not actually sending back the response data to the client 610.

Figure 7:
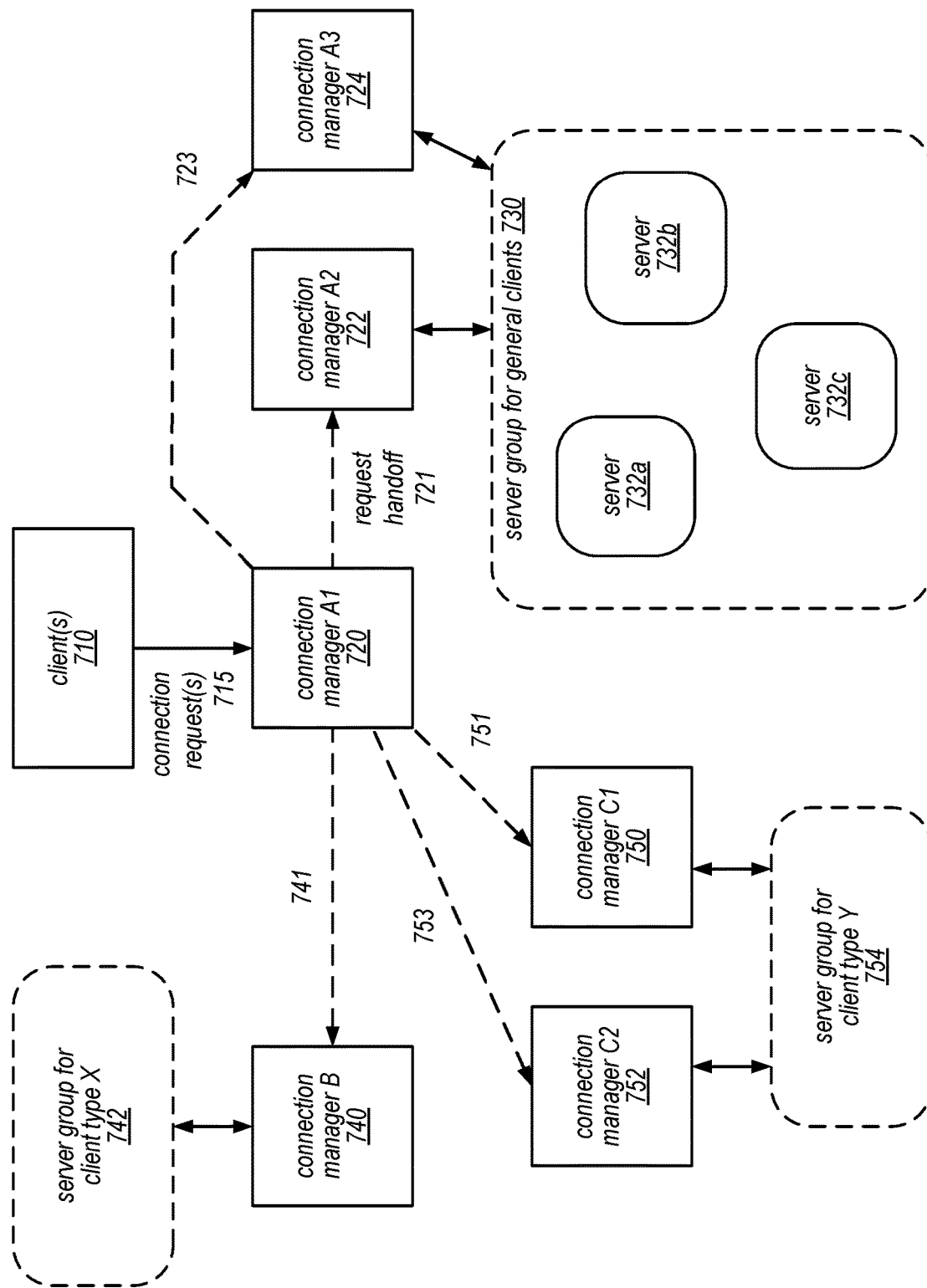
FIG. 7 is a diagram illustrating example behavior of a group of database connection managers to handoff database connection requests to one another, according to some embodiments.

FIG. 7 is a diagram illustrating example behavior of a group of database connection managers to handoff database connection requests to one another, according to some embodiments. As shown, in some embodiments, the database system may actually employ a group of database connection managers such as database connection manager 140. For example, in the illustrated example, six connection managers 720, 722, 724, 740, 750, and 752 are employed. Together, these database connection managers may implement a database statement routing layer that establishes connections to the external clients 710. In some embodiments, these connection managers may be dynamically managed to recover from node failures and scale to match the level of client demand.

As shown, in the illustrated example, the client 710 issues a connection request 715 to connection manager A1 720. In some embodiments, the connection manager A1 may implement a capability to handoff the connection request to another connection manager node. In some embodiments, the connection manager A1 720 may be a manager of managers, so that all it does is to forward connection requests to other connection managers. In some embodiments, the group of connection managers may implement a tree, or a graph, where each parent manager in the graph selects one child in the graph to handle the connection request. In some embodiments, as shown, the leaf connection managers in the tree or graph are then actually responsible for routing statements to the servers. In some embodiments, the graph may not have any directed cycles, so that the handoff process will always terminate. In some embodiments, the connection manager A1 720 may also itself maintain server connections to the servers. For example, in some embodiments, the connection manager A1 may elect to hand off a connection request if it is already maintaining a large number of client connections, or when connection manager A1 is itself under heavy load, As shown, connection manager A1 may elect to hand off the connection request to another connection manager (e.g., connection manager A2 722 or A3 724). In some embodiments, the handoff may be performed at the time of the initial connection request. In some embodiments, connection managers A2 and A3 may further forward connection requests down the graph. As may be understood, different topologies may be implemented to handle connection requests, based on the needs of the system.

In some embodiments, as shown, connection manager A1 may hand off connection requests based on other factors, such as for example the type of the client. For example, in some embodiments, the database may employ different groups of specialized database servers, such as server group 730, 742, and 752. As shown, server group 730 may be used for general clients, server group 742 may be used for clients of type X, and server group 754 may be used for clients of type Y. For example, this arrangement of server groups may be used to enforce client access permissions for the different types of clients, in some embodiments. As another example, this arrangement of server groups may be used to implement server groups in different geographic locations to better serve clients in the different locations. In some embodiments, the initial connection manager (e.g., connection manager A1) that receives the connection request 715 may make a determination as to the type of the client. Based on that determination, connection manager A1 may then hand off the connection request to another connection manager associated with another server group that corresponds to that client. Thus, for example, depending on the type of the client 710, connection manager A1 may hand off the request either to connection manager B 740, which maintains server connections with the servers in server group 742, or connection manager C1 750, which maintains server connections with the servers in server group 754. In this manner, the connection manager fleet is able to select a connection manager that is best able to service each client 710.

Figure 8:
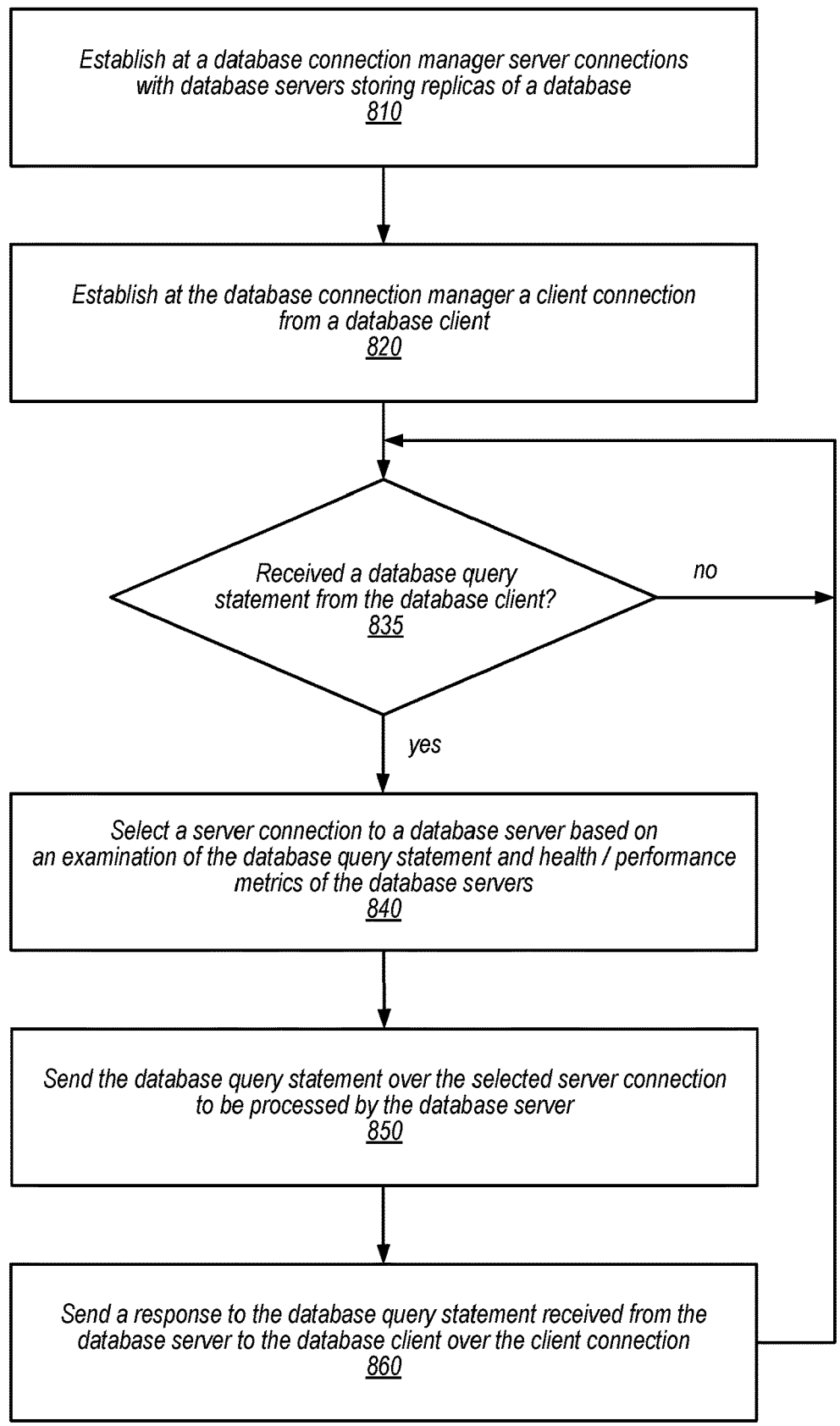
FIG. 8 is a flowchart illustrating a process performed by a database connection manager to route statements from database clients to database servers, according to some embodiments.

FIG. 8 is a flowchart illustrating a process performed by a database connection manager to route statements from database clients to database servers, according to some embodiments.

At operation 810, database connections are established, at a connection manager, with servers storing replicas of a database. The connection manager may be, for example, the database connection manager 140 of FIG. 1. The servers may be, for example, servers 132 as discussed in connection with FIG. 1. Depending on the embodiment, the servers may be physical hosts, virtual machine instances, or database instances. In some embodiments, the servers may form a replica server group which may contain read replica servers and write replica servers. In some embodiments, the server connections may be TCP/IP connections, or some other type of connections used to communicate database requests to the servers. In some embodiments, the connections or database statements may be defined as part of a data access interface (e.g., interface 134 of FIG. 1) of the servers. In some embodiments, the data access interface of connection manager may mimic the data access interface of the database servers, so that clients connecting to the database connection manager see the connection manager as just another database server.

At operation 820, a database connection is established, at the connection manager, from a client of the database. In some embodiments, the client may be a client 110 of FIG. 1, that establish connections over for example network 120 of FIG. 1, which may be a public network such as the Internet. In some embodiments, the connections may be established at the request of individual clients, which may connect to the database via a data access interface of the database connection manager, such as interface 142 in FIG. 1. Depending on the embodiment, the connections may be TCP/IP connections, or some other type of connections used to receive database statements and send responses to the clients. In some embodiments, the connection protocol may implement an encryption of the communication over the connection, so that contents of the communication may be secured over an unprotected network. In some embodiments, the database connection manager may implement a separate encryption and decryption module to communicate with the client. In some embodiments, the connection protocol may implement a compression of the data over the connection (e.g., large read results), so that the data may be transmitted faster. In some embodiments, compression of data may be performed by the database connection manager, separate from the connection.

At operation 835, a determination is made whether a database query statement has been received from the client. In some embodiments, after a client connection has been established, the client may send a number of database query statements over that client connection to the database connection manager. In some embodiments, database query statements may include both read and write statements, for example, queries or update requests to the replicas hosted by the servers. These statements may include statements to read data, write data, or perform other actions on the data in the database. Depending on the embodiment, they may be SQL statement, or API requests, among other things. In some embodiments, the database connection manager may implement modules to accept these statements from many different clients and return responses for these statements. If no database statements are received, the database connection manager will continue to wait. If a database statement is received, the database connection manager will proceed to operation 840 to handle to statement.

At operation 840, a server connection is selected to a database server. In some embodiments, the server connection may be used to forward the database query statement to the corresponding server, to allow the server to handle the database query statement. In some embodiments, the server or server connection may be selected based on an examination of the database statement, and also health or performance metrics for the database servers.

In some embodiments, the database connection manager may examine the database query statement and make one or more classifications of the statement (e.g., whether it is a read or a write statement). For example, in some embodiments, some type of statements must be handled by some type of database server. For example, in some embodiments, write statements cannot be handled by read replica servers, whose data is read-only.

As discussed, in some embodiments, the selection may also depend on health or performance metrics of the servers, so the connection manager may perform a load balancing function among the servers. In some embodiments, the database connection manager may employ a metrics monitor (e.g., the server metrics monitor 152 of FIG. 1), to monitor or collect various metrics of the individual servers. The collected metrics may include data such as server load metrics, CPU utilization metrics, memory utilization metrics, storage utilization metrics, network utilization metrics, request count, request latency, or error count, among other things. In some embodiments, the metrics may be gathered by periodically polling the servers or queries another entity that collects or maintains such information. In some embodiments, the servers themselves may periodically report this data via heartbeat messages that indicate their health status. In some embodiments, these metrics are tracked by the database connection manager to determine how to route incoming statements to the group of servers, so as to load balance the individual servers. In some embodiments, the routing decision of the database connection manager may be performed based on a configurable routing policy. Depending on this information, the connection manager may select an appropriate server that is best able to handle the incoming statement.

At operation 850, the database query statement is sent over the selected server connection to the select server, to be processed by the selected server. Then, at operation 860, a response to the database query statement, received from the selected database server, is send to the database client over the client connection. As discussed, in some embodiments, the database connection manager may act as an intermediate node that terminates both the client connection and the server connection. Thus, the database connection manager may forward client communications to the server and server communications to the client. For example, for a read statement, the database connection manager may forward the results of that read statement to the client. For a write statement, the database connection manager may forward the server's acknowledgement of the write to the client. In some embodiments, the database connection manager may perform certain translation functions when forwarding communications between the client and the server. For example, in some embodiments, the database connection manager may decrypt and decompress statements from the client and then encrypt and compress results from the server.

Figure 9:
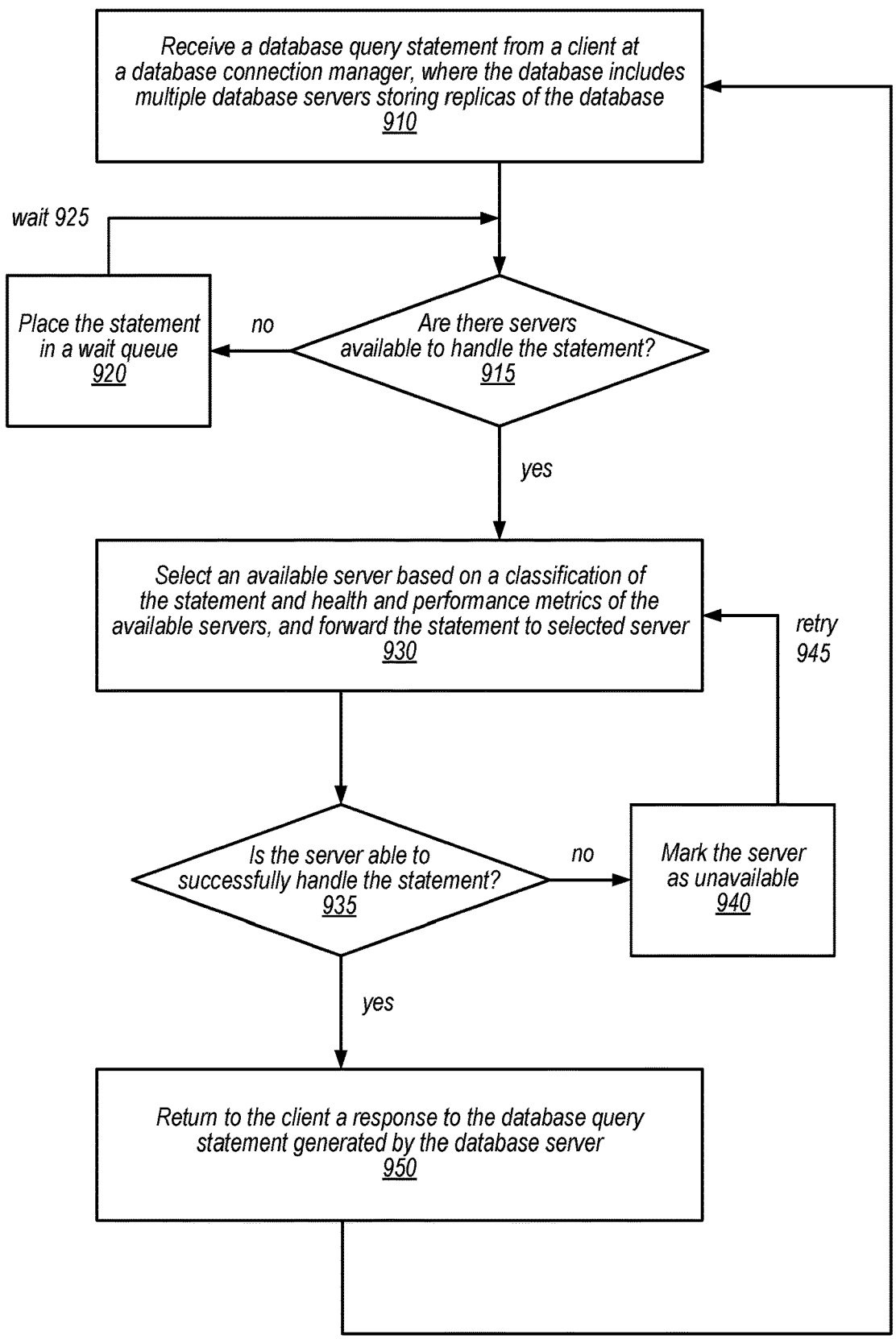
FIG. 9 is a flowchart illustrating a process performed by a database connection manager to queue and retry database query statements, according to some embodiments.

FIG. 9 is a flowchart illustrating a process performed by a database connection manager to queue and retry database query statements, according to some embodiments.

At operation 910, a database query statement is received from a client at a database connection manager. The database may include multiple servers storing replicas of the database. In some embodiments, the database may comprise database 130, as discussed in connection with FIG. 1 and the database connection manager may comprise database connection manager 140 of FIG. 1. In some embodiments, operation 910 may be performed in a similar fashion as discussed in connection with operation 835 of FIG. 8.

At operation 915, a determination is made whether any servers are currently available to handle the statement. In some embodiments, a routing policy of the database connection manager may specify that certain servers are not qualified to handle a statement, or certain conditions under which a server cannot handle a statement. For example, in some embodiments, only servers hosting writable replicas can handle write statements. In some embodiments, a server that is exhibiting certain error conditions, that is unresponsive, that is undergoing a maintenance operation, or that is extremely busy as indicated by its metrics data, may be deemed unavailable to handle an incoming statement.

If no available servers are found, the process proceeds to operation 920, where the statement is placed on a wait queue. The wait queue may be, for example, the queue 420, as discussed in connection with FIG. 4. In some embodiments, only a single queue may be employed. In some embodiments, different queues may be used for different types of statements, different types of clients, or different types of servers. In some embodiments, only certain types of statements may be queued, while other statements may be simply dropped. In some embodiments, statements may be queue according to a priority order, for example, first in first out, and when an appropriate server that can handle the statement becomes available, that statement may be removed from the queue and routed to the newly available server. In some embodiments, during the wait period, the database connection manager may stall the client by providing an indication of the queuing, or an indication of progress of the statement's processing. In some embodiments, in the event that the wait queue overflows or reaches a certain capacity, the database connection manager may refuse additional statements and/or drop certain already-queued statements. In this manner, the database connection manager may serve the function of shielding the database servers from certain types of attacks as distributed denial-of-service attacks. As shown, once a statement is placed on the queue, the system may wait 925 until a server qualified to handle the statement becomes available, at which point the statement is dequeued.

If some available servers are found, the process proceeds to operation 930, where a server is selected to handle the statement. The server may be selected based on the servers' performance metrics and the type of database, in a similar fashion as discussed in connection with operation 840 of FIG. 8. The database statement is then forwarded to the selected server. As discussed, in some embodiments, the database connection manager maintains server connections to the servers, and the statement may be forwarded over the server connection for the selected server.

At operation 935, a determination is made whether the server is able to successfully handle the database query statement. In some embodiments, after a statement is routed to a server, the database connection manager may recognize conditions that indicate that the server is not able to handle the statement. For example, as discussed in connection with FIG. 4, such conditions may include a lost connection with the server, a timeout from the server, failure of the server to provide a periodic health message, an error (such as a throttle exception) issue by the server, among other things.

If such an error condition is detected (i.e., the server is not able to successfully handle the statement), the process proceeds to operation 940, where the selected server is marked as unavailable. In some embodiments, the marking may exclude the server from being used to retry the same database query statement. The process then proceeds back to operation 930, where another server is selected to retry 945 the statement. For example, the database connection manager may select a next available server based on the server metrics, and forward the statement to that next available server. The process may continue from one server to the next, until some available server is able to successfully process the statement.

If the selected server is able to successfully handle the statement, the process proceeds to operation 950, where a response to the statement is returned to the client. As discussed, in some embodiments, the response is generated by the selected server and received from the server via its server connection, and is returned to the client via that client's client connection. In some embodiments, a DSR protocol may be used, where the server returns the response to the statement directly to the client. In some embodiments, operation 950 may be performed in similar fashion as described in connection with operation 850 of FIG. 8. The process than returns to operation 910, where another incoming database statement is received.

Figure 10:
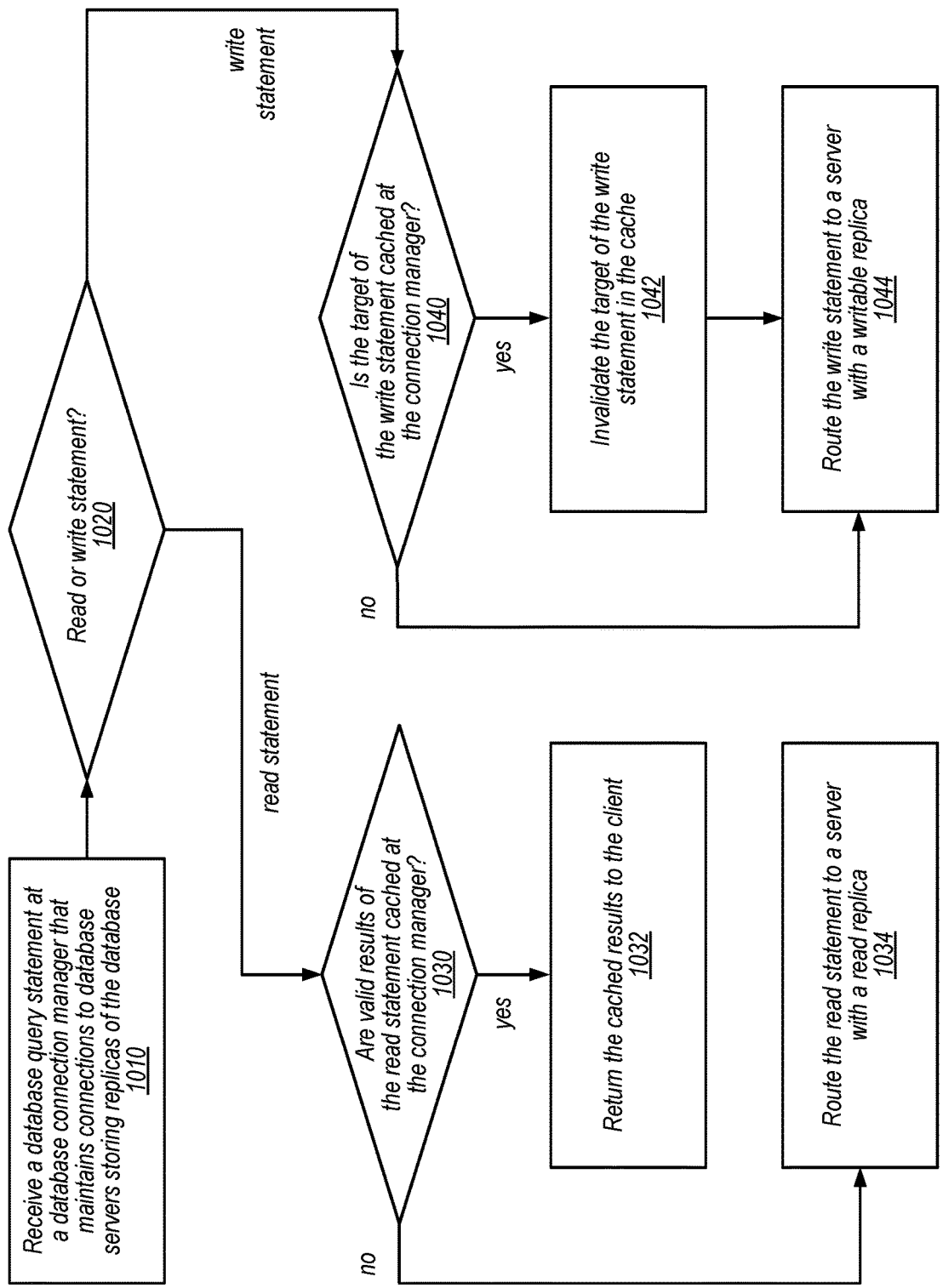
FIG. 10 is a flowchart illustrating a process performed by a database connection manager to cache the results of read statements, according to some embodiments.

FIG. 10 is a flowchart illustrating a process performed by a database connection manager to cache the results of read statements, according to some embodiments.

At operation 1010, a database query statement is received from a client at a database connection manager. The database may include multiple servers storing replicated data. In some embodiments, the database may comprise database 130, as discussed in connection with FIG. 1, and the database connection manager may comprise database connection manager 140 of FIG. 1. In some embodiments, operation 1010 may be performed in a similar fashion as discussed in connection with operation 835 of FIG. 8.

At operation 1020, a determination is made whether the statement is a read statement or a write statement. As discussed, in some embodiments, the database connection manager may perform a parsing or interpretation of the incoming database statement, to determine one or more classifications of the statement. For example, in some embodiments, the database connection manager may determine whether the statement is a read statement (e.g., a database query) or a write statement (e.g., a database update) based on the commands in a receive SQL statement. In some embodiments, the determination may be made based on which calls were used in a data access API. If the statement is a read statement, the process proceeds to operation 1030 to handle the read statement. If the statement is a write statement, the process proceeds to operation 1040 to handle the write statement.

At operation 1030, another determination is made whether valid results of the read statement are cached at the database connection manager. As discussed, in some embodiments, the connection manager may maintain a results cache, for example, the read results cache 640 of FIG. 6. In some embodiments, certain results of read statements may be cached in a manner that allows the connection manager to determine if a subsequent read statement can be satisfied with the cache's contents. For example, in some embodiments, the cached results may be stored based on the read statements themselves (e.g., SQL queries). In some embodiments, the cache results may be stored in the cache along with their identifying keys. In some embodiments, each entry in the cache may include a validity flag, indicating whether the cached entry is currently valid. For example, a cached entry may be invalid if the underlying data for the entry in the database is known to have diverged from the cached entry. By checking such metadata in the cache entries with the read statement, the database connection manager is able to determine whether a read statement results in a hit or a miss with respect to the results cache.

At operation 1032, if valid results do exist in the cache for the read statement, this represents a cache hit. In this case, the cached results (e.g., the contents of the cache entry or entries satisfying the read statement) may be returned to the client via the client connection. In some embodiments, the read statement will not be forwarded to the database servers for fetching. In some embodiments, with each cache hit, metadata for the cache entry may be updated. Such metadata may be used to determine whether or when cache entries will be evicted from the cache. For example, in some embodiments, recently accessed cache entries may be maintained in favor or cache entries that have not been recently accessed.

At operation 1034, if valid results do not exist in the cache of the read statement, this represents a cache miss. In this case, the read statement is routed to a read replica server to obtain the read results. In some embodiments, the routing may be performed using server metrics or classifications of the read statement, as discussed for example in connection with operation 840 of FIG. 8. In some embodiments, depending on the routing policy of the connection manager, read statements may always be routed to read replica servers. In this manner, replica servers that allow data to be written are generally not burdened with handling read statements. In some embodiments, the routing policy may prefer read replica servers to handle read statements, but still allow write replica servers to handle read statement under certain conditions. In some embodiments, when the results are obtained by the database connection manager from the server, the database connection manager may update the results cache with the results, so that a subsequent read statement for the same data may be handled using just the cached data.

At operation 1040, as shown, another determination is made whether the target of the write statement is cached at the database connection manager. As discussed, in some embodiments, the database connection manager may be able to determine that a write statement impacts some number of cached entries in the results cache. In some embodiments, the database connection manager may conservatively determine that a certain set of cached entries is impacted by the write statement, even though not every entry in the set is impacted. For example, in some embodiments, a write to a particular table may be deemed to impact all cached entries associated with the table.

If a target of the write statement is found in the results cache, the process proceeds to operation 1042, where the target of the write statement in the cache is invalidated. As discussed, the target of the write statement may comprise a set of cache entries that are deemed to have been impacted by the write statement. In some embodiments, the invalidation of these entries is performed by modifying a validity flag associated with each entry. In some embodiments, invalid entries cannot be used to satisfy subsequent read statements.

In some embodiments, the contents of the results cache may become stale in ways other than via write statements received from clients. For example, in some embodiments, the data of the database may change based on one or more triggers, or due to periodic programs running in the background. Thus, in some embodiments, other mechanisms of invalidating the results cache may exist. For example, in some embodiments, the connection manager may register to receive updates from the database servers, which may cause the connection manager to update its cache state.

If the target of the write statement is not found in the results cache, the process proceeds directly to operation 1044, where the write statement is routed to a server with a writable replica to apply the write statement. In some embodiments, the routing may be performed using server metrics or classifications of the write statement, as discussed for example in connection with operation 840 of FIG. 8. In some embodiments, write statements are always be routed to write replica servers. In some embodiments, the contents of the write replica server may be brought back into the results cache in the database connection manager. Thus, newly written data in the database are immediately cached in the results cache. As shown, operation 1044 may be performed regardless of whether the write statement's target was found in the cache. However, in some embodiments, the write statement may not be routed to a database server immediately. Rather, the write statement may only update the results cache, and such entries in the results cache may be later flushed to database servers. In some embodiments, the lazy written of such data to the persistent storage allows write statements to be acknowledged more quickly to the client.

Figure 11:
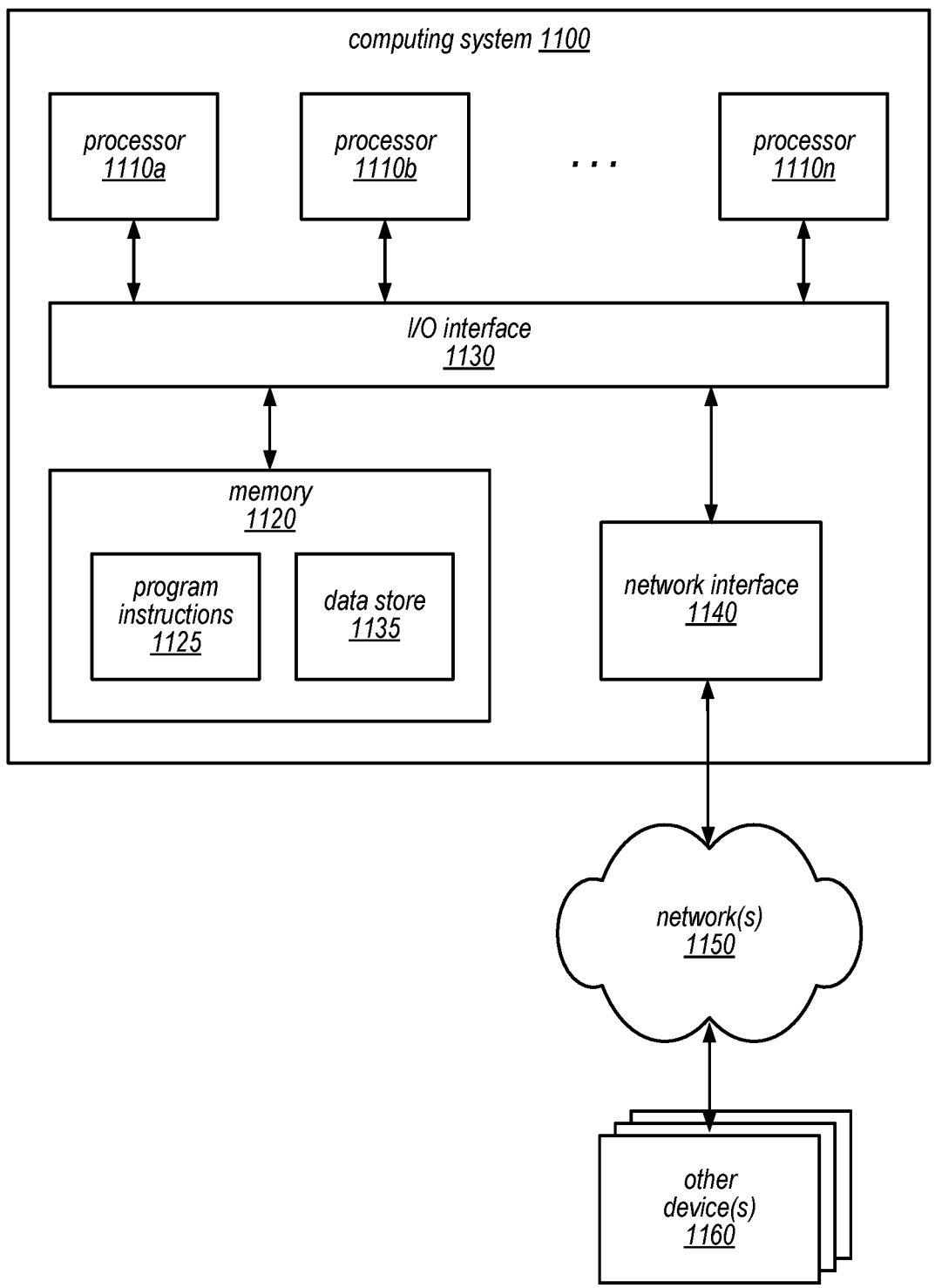
FIG. 11 is a block diagram illustrating an example computer system that can be used to implement one or more portions of a database connection manager that routes database statements to different replica servers based on server metrics, according to some embodiments.

FIG. 11 is a block diagram illustrating an example computer system that can be used to implement one or more portions of a database connection manager that routes database statements to different replica servers based on server metrics, according to some embodiments. Computer system 1100 may include or be configured to access one or more nonvolatile computer-accessible media. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code 1125 and data 1135.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 920, may be incorporated directly into processor 1110.

Network interface 1140 may be configured to allow data to be exchanged between computer system 1100 and other devices 1160 attached to a network or networks 1150, such as other computer systems or devices, such as routers and other computing devices, as illustrated in FIGS. 1 through 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANS, or via any other suitable type of network and/or protocol.

In some embodiments, system memory 1120 may be one embodiment of a computer-accessible medium configured to store program instructions and data as described above for FIGS. 1 through 10 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
a plurality of database servers that stores replicated data of a database on respective persistent storage devices; and
a connection manager configured to:
  establish respective database connections to the plurality of database servers;
  establish a database connection from a database client to the connection manager;
  receive a plurality of database query statements from the database client on the database connection to the database client;
  select, for individual ones of the database query statements, one of the database connections to send an individual database query statement to a selected one of the database servers, wherein the individual database query statement belongs to a classification of database query statements assigned to the selected database server, and the selected database server is selected to process the individual database query statement based at least in part on one or more health or performance metrics of the selected database server including an amount of read or write traffic that originated the selected database server to a persistent storage device;
  in response to determining that no database server is available to process a particular one of the database query statements of a particular classification, add the particular database query statement to a queue of database statements at the connection manager, wherein the particular database query statement is dequeued when the connection manager determines that at least one database server assigned to process the particular classification of the particular database query statement has become available; and
  after a determination of an overflow of the queue of database statements wherein the queue reaches a capacity, deny further database query statements of the particular classification received from the database client over the database connection and issue one or more busy errors or throttle exceptions to one or more database clients associated with the further database query statements.

2. The system of claim 1, wherein the plurality of database servers are classified into read replica servers that process read statements and write replica servers that process write statements.

3. The system of claim 1, wherein the database servers implement a data access interface, and the connection manager implements the same data access interface.

4. The system of claim 1, wherein the connection manager is configured to:
send a database query statement from the database client to the selected server of the plurality of database servers;
determine that an error has occurred with the selected server before the selected server fully processes the database query statement;
responsive to the determination of the error, send the database query statement to a second server of the plurality of database servers.

5. The system of claim 1, wherein the connection manager is configured to:
monitor the one or more health or performance metrics for each of the database servers, wherein the one or more health or performance metrics comprises one or more of: a load metric, an operational state, or a latency measure of respective database servers.

6. A method, comprising:
establishing respective database connections from a connection manager to a plurality of database servers that stores replicated data of a database on respective persistent storage devices, wherein the database servers implement a data access interface and the connection manager implements the same data access interface;
establishing a database connection from a database client to the connection manager;
receiving a plurality of database query statements from the database client on the database connection to the database client;
selecting, for individual ones of the database query statements, one of the database connections to send an individual database query statement to a selected one of the database servers, wherein the individual database query statement belongs to a classification of database query statements assigned to the selected database server, and the selected database server is selected to process the individual database query statement based at least in part on one or more health or performance metrics of the selected database server including an amount of read or write traffic that originated the selected database server to a persistent storage device;
in response to determining that no database server is available to process a particular one of the database query statements of a particular classification, adding the particular database query statement to a queue of database statements at the connection manager, wherein the particular database query statement is dequeued when the connection manager determines that at least one database server assigned to process the particular classification of the particular database query statement has become available; and
after a determination of an overflow of the queue of database statements wherein the queue reaches a capacity, denying of further database query statements of the particular classification received from the database client over the database connection and issuing one or more busy errors or throttle exceptions to one or more database clients associated with the further database query statements.

7. The method of claim 6, wherein an incoming database statement is classified based on whether the incoming database statement is a read or write statement, a database object targeted by the incoming database statement, a client identifier of the incoming database statement, or a timestamp of the incoming database statement.

8. The method of claim 6, wherein the plurality of database servers is organized in a network topology, and wherein selecting one of the database connections for a database query statement is based at least in part on the database servers' locations in the network topology.

9. The method of claim 6, wherein the connection manager selects database servers for the classification of database query statements according to a preference list of database servers.

10. The method of claim 6, further comprising:
performing, via the connection manager:
  receiving a database query statement from the database client;
  determining that valid results for the database query statement are stored in a results cache of the connection manager; and returning the valid results in the cache to the database client without sending the database query statement to one of the plurality of database servers.

11. The method of claim 6, further comprising:
performing, via the connection manager:
sending a database query statement to the selected server of the plurality of database servers;
determining that an error has occurred with the selected server before the selected server fully processed the database query statement;
responsive to the determination of the error, sending the database query statement to a second server of the plurality of database servers.

12. The method of claim 11, where the determination of the error comprises detecting a lost connection with the selected server or a timeout condition for the selected server.

13. The method of claim 6, further comprising monitoring the one or more health or performance metrics for each of the database servers, wherein the one or more health or performance metrics comprises one or more of: a load metric, an operational state, or a latency measure of respective database servers.

14. The method of claim 6, further comprising:
performing, via the connection manager:
sending the database query statements to respective selected database servers;
receiving respective responses to the database query statements from the respective selected database servers; and
sending the respective responses to the database client via the database connection to the client.

15. The method of claim 6, further comprising:
performing, via one of the plurality of database servers:
processing a received database query statement to generate a response to the database query statement; and
sending the response to the database client without employing the database connections at the connection manager, such that the response appears to the database client to be sent from the connection manager.

16. The method of claim 6, further comprising:
performing, via a second connection manager:
receiving a connection request from the database client to establish the database connection to the database client;
determining based at least in part on a metric of the connection manager, that the database connection to the database client should be established at the connection manager; and
forwarding the connection request to connection manager.

17. A non-transitory computer-accessible storage medium storing program instructions that when executed on one or more processors of a connection manager for a database, cause the connection manager to:
establish respective database connections from the connection manager to a plurality of database servers that stores replicated data of a database on respective persistent storage devices;
establish a database connection from a database client to the connection manager;
receive a plurality of database query statements from the database client on the database connection to the database client;
select, for individual ones of the database query statements, one of the database connections to send an individual database query statement to one of the database servers, wherein the individual database query statement belongs to a classification of database query statements assigned to the selected database server, and the selected database server is selected to process the individual database query statement based at least in part on one or more health or performance metrics of the selected database server including an amount of read or write traffic that originated the selected database server to a persistent storage device;
in response to determining that no database server is available to process a particular one of the database query statements of a particular classification, add the particular database query statement to a queue of database statements at the connection manager, wherein the particular database query statement is dequeued when the connection manager determines that at least one database server assigned to process the particular classification of the particular database query statement has become available; and
after a determination of an overflow of the queue of database statements wherein the queue reaches a capacity, deny further database query statements of the particular classification received from the database client over the database connection and issue one or more busy errors or throttle exceptions to one or more database clients associated with the further database query statements.

18. The non-transitory computer-accessible storage medium of claim 17, wherein the classification of the database query statement is performed based on a parsing or interpretation of the database query statement by the connection manager.

19. The non-transitory computer-accessible storage medium of claim 17, wherein the program instructions when executed on the one or more processors cause the connection manager to:
monitor the one or more health or performance metrics for each of the database servers, wherein the one or more health or performance metrics comprises one or more of: a load metric, an operational state, or a latency measure of a respective database server.

* * * * *